US008954741B2

(12) United States Patent
Suh et al.

(10) Patent No.: US 8,954,741 B2
(45) Date of Patent: Feb. 10, 2015

(54) APPARATUS AND METHOD FOR SUPPORTING FAMILY CLOUD IN CLOUD COMPUTING SYSTEM

(75) Inventors: Kyung-Joo Suh, Seoul (KR); Jung-Shin Park, Seoul (KR); Jung-Je Son, Yongin-si (KR); Sang-Soo Jeong, Suwon-si (KR); Beom-Sik Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/587,198

(22) Filed: Aug. 16, 2012

(65) Prior Publication Data

US 2013/0046982 A1 Feb. 21, 2013

(30) Foreign Application Priority Data

Aug. 18, 2011 (KR) .................... 10-2011-0082486

(51) Int. Cl.
*H04L 9/32* (2006.01)
*G06F 15/173* (2006.01)
(Continued)

(52) U.S. Cl.
CPC ............ *G06F 9/5072* (2013.01); *H04L 9/0825* (2013.01); *H04L 9/0827* (2013.01); *H04L 9/083* (2013.01); *H04L 63/102* (2013.01); *H04L 63/104* (2013.01); *G06F 21/6218* (2013.01); *H04L 63/0442* (2013.01); *H04L 63/062* (2013.01); *H04L 63/083* (2013.01); *H04L 63/0876* (2013.01)
USPC .......................................... 713/171; 709/223

(58) Field of Classification Search
CPC .. H04L 63/104; H04L 63/083; G06F 21/6218
USPC ............ 380/47, 277–286; 709/223–232, 201; 713/155–159, 171; 726/4
See application file for complete search history.

(56) References Cited

U.S. PATENT DOCUMENTS 8,260,931 B2 * 9/2012 Balasubramanian et al. 709/226
8,468,352 B2 * 6/2013 Teather et al. ................ 713/171
(Continued)

FOREIGN PATENT DOCUMENTS

KR 10-2010-0107113 A 10/2010
KR 10-2011-0058679 A 6/2011
KR 10-2011-0061342 A 6/2011

OTHER PUBLICATIONS

R. L. Rivest, A. Shamir, and L. Adleman. 1978. A method for obtaining digital signatures and public-key cryptosystems. Commun. ACM 21, 2 (Feb. 1978), 120-126. DOI=10.1145/359340.359342 http://doi.acm.org/10.1145/359340.35934.*

(Continued)

*Primary Examiner* — Saleh Najjar
*Assistant Examiner* — Feliciano Mejia
(74) *Attorney, Agent, or Firm* — Jefferson IP Law, LLP

(57) ABSTRACT

A method and an apparatus for effective data sharing between users in a cloud computing system are provided. The cloud computing system includes a first cloud hub and a User Equipment (UE). The first cloud hub provides a cloud service to a UE connected by a public cloud access and provides a cloud service to a UE connected to a public personal cloud system installed by a service provider, and is installed by a user. The UE subscribes to the first cloud hub as a main cloud and inquires as to data stored in the first cloud hub.

20 Claims, 17 Drawing Sheets

(51) Int. Cl.
*G06F 9/50* (2006.01)
*H04L 9/08* (2006.01)
*H04L 29/06* (2006.01)
*G06F 21/62* (2013.01)

(56) References Cited

U.S. PATENT DOCUMENTS

2005/0193103 A1\* 9/2005 Drabik .......................... 709/221

2011/0231899 A1\* 9/2011 Pulier et al. ....................... 726/1

OTHER PUBLICATIONS

Audun Nordal et al, 'Balava: Federating Private and Public Clouds', In: IE EE World Congress on Services, Jul. 2011, pp. 569-577. See section II and figure 1.

\* cited by examiner

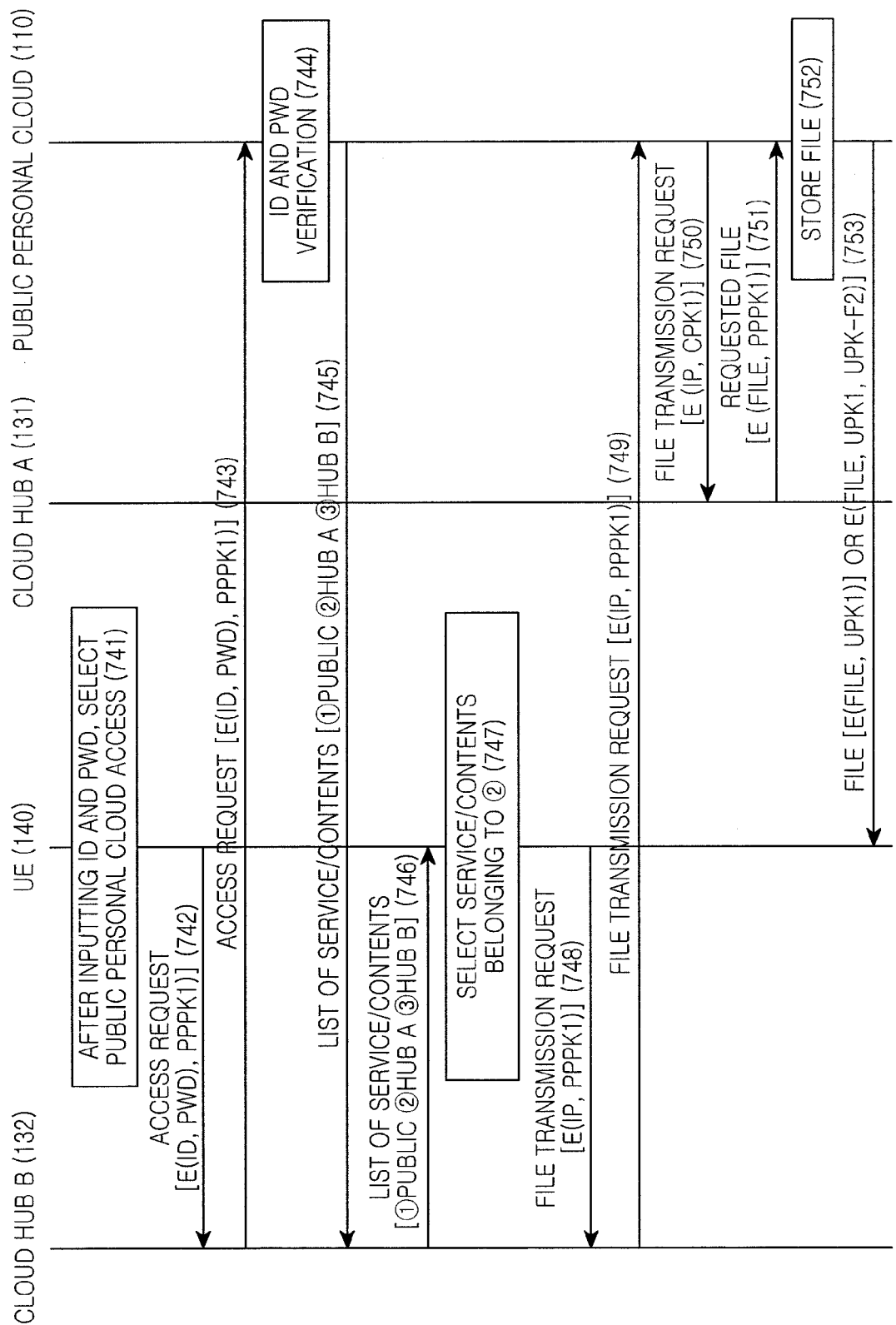

APPARATUS AND METHOD FOR SUPPORTING FAMILY CLOUD IN CLOUD COMPUTING SYSTEM

PRIORITY

This application claims benefit under 35 U.S.C. §119(a) of a Korean patent application filed on Aug. 18, 2011 in the Korean Intellectual Property Office and assigned Serial No. 10-2011-0082486, the entire contents of which are hereby incorporated by reference.

BACKGROUND OF THE INVENTION

1. Field of the Invention

The present invention relates to a cloud computing system. More particularly, the present invention relates to an apparatus and method for supporting a family cloud in a cloud computing system.

2. Description of the Related Art

Cloud computing, an Internet-based computing technology, is a service for providing data, which is stored in a server on the Internet, to a client terminal on an as need basis. An example of a client terminal is a personal computer, a mobile phone and the like. Various techniques for sharing data in a cloud computing system have been considered. However, under the cloud computing system structure of the related art, there is a limitation when a terminal uses another cloud service or contents. Accordingly, there is a need for an efficient way to share data between users in the cloud computing system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages below. Accordingly, an aspect of the present invention is to provide an apparatus and method for sharing data between users in a cloud computing system.

Another aspect of the present invention is to provide an apparatus and method for supporting a family cloud in a cloud computing system.

The above aspects are addressed by providing an apparatus and method for supporting a family cloud in a cloud computing system.

In accordance with an aspect of the present invention, an operation method of a User Equipment (UE) in a cloud computing system is provided. The method includes subscribing to a first cloud hub as a main cloud, and inquiring as to at least one of data stored in the first cloud hub and data stored in a public personal cloud system. The first cloud hub is installed by a user, and provides a cloud service to a UE connected by a local cloud access. The public personal cloud system is installed by a service provider, and provides a cloud service to a UE connected by a public cloud access.

According to another aspect of the present invention, an operation method of a cloud hub in a cloud computing system is provided. The method includes registering to a public personal cloud system as a cloud hub, registering a first UE as a main subscriber, and performing a procedure for providing data to the first UE in response to a transmission request received from the first UE. The cloud hub is installed by a user, and provides a cloud service to a UE connected by a local cloud access. The public personal cloud system is installed by a service provider, and provides a cloud service to a UE connected by a public cloud access.

According to still another aspect of the present invention, a UE apparatus in a cloud computing system is provided. The apparatus includes a controller and a communication unit. The controller subscribes to a first cloud hub as a main cloud. The communication unit receives at least one of data stored in the first cloud hub and data stored in a public personal cloud system. The first cloud hub is installed by a user, and provides a cloud service to a UE connected by a local cloud access. The public personal cloud system is installed by a service provider, and provides a cloud service to a UE connected by a public cloud access.

According to a yet another aspect of the present invention, a cloud hub apparatus in a cloud computing system is provided. The apparatus includes a local communication unit, a core network communication unit, and a controller. The local communication unit performs communication with at least one UE. The core network communication unit performs communication with a core network. The controller registers to a public personal cloud system as a cloud hub, registers a first UE as a main subscriber, and performs a procedure for providing data to the first UE in response to a transmission request received from the first UE. The cloud hub is installed by a user, and provides a cloud service to a UE connected by a local cloud access. The public personal cloud system is installed by a service provider, and provides a cloud service to a UE connected by a public cloud access.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will become more apparent from the following description when taken in conjunction with the accompanying drawings in which:

FIGS. 7A to 7E are diagrams illustrating signaling for data inquiry in an environment in which a family cloud is accessible to a local in a cloud computing system according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention describe a technology for data sharing in a cloud computing system. The following description proposes a way for facilitating easy data sharing and use between clouds defined as a family cloud for a cloud service in an Internet environment, and provides security, access management and data sharing of a cloud group grouped as a family cloud through a public personal cloud provided by a service provider. For convenience in explanation, the exemplary embodiments of the present invention are described in the context of, for example, the cloud computing environment. However, the present invention is not limited thereto and can similarly be applied in other environments using cloud computing. Further, the techniques described herein for managing a family cloud and storing related information in the exemplary embodiments of the present invention can be variously modified within the spirit and scope of the present invention.

Figure 1:
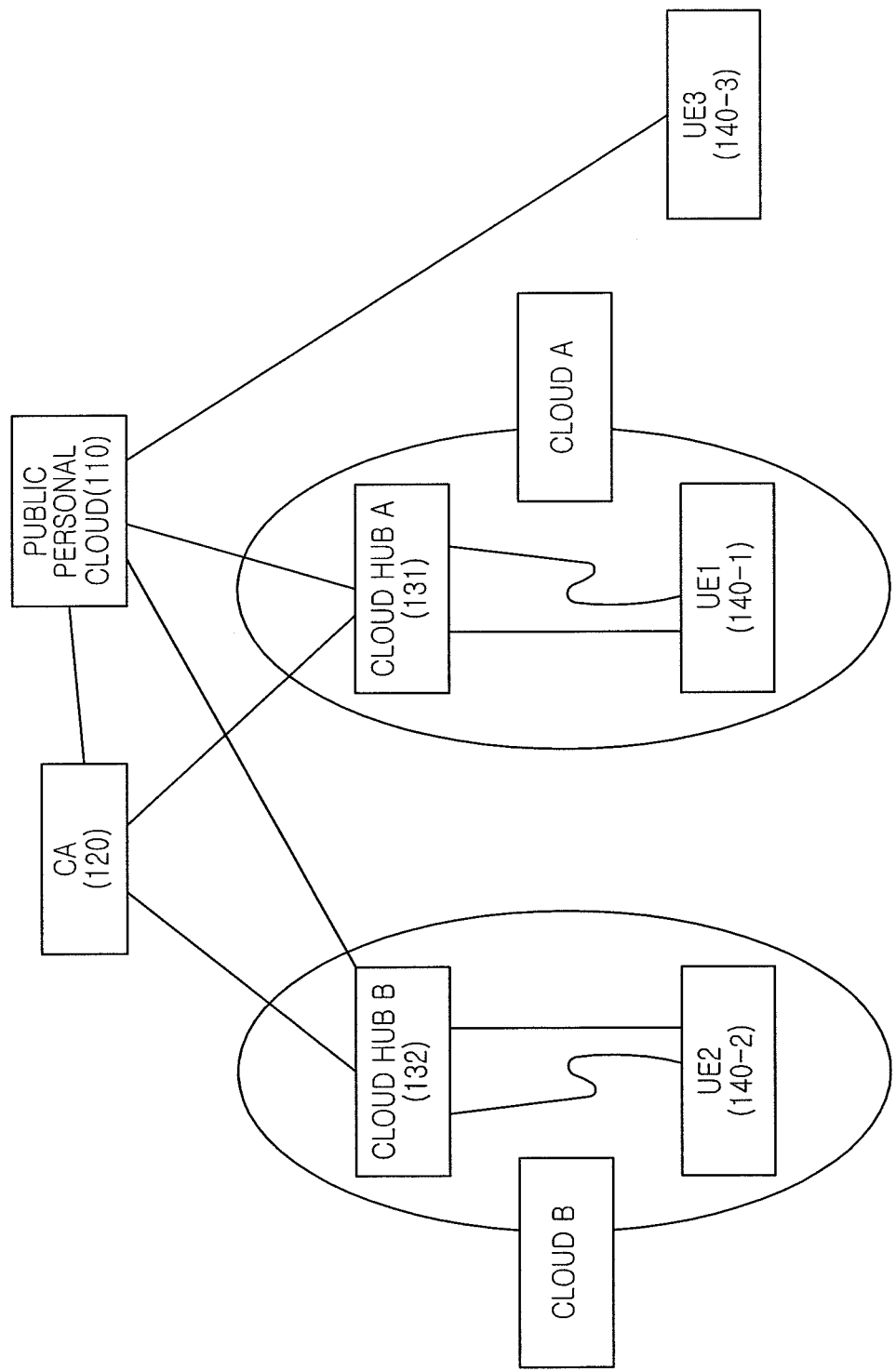
FIG. 1 is a diagram schematically illustrating the environment of a cloud computing system according to an exemplary embodiment of the present invention.

FIG. 1 schematically illustrates an environment of a cloud computing system according to an exemplary embodiment of the present invention. More specifically, FIG. 1 illustrates a system structure forming a hierarchy relationship between clouds, by way of example.

In the present exemplary embodiment, a description is made in the context of the Internet environment. This method can be used even in a mobile communication system of an Evolved Universal Terrestrial Radio Access Network (EU-TRAN), and other similar Internet system environments providing an Internet service irrespective of an access technology such as Wireless Fidelity (WiFi) and the like.

Referring to FIG. 1, a public personal cloud system 110, which is an entity for providing a public personal cloud service, provides a cloud service to not only a User Equipment (UE), such as UE3 140-3, having direct access to an Internet network, but also a UE, such as UE1 140-1 and UE2, 140-2, having access to the Internet network through a cloud hub, such as cloud hub A 131 and cloud hub B 132, and manages information related to cloud service subscription of a subscriber (i.e., a user). More particularly, according to an exemplary embodiment of the present invention, when the subscriber attempts to gain access to data through the Internet network, the public personal cloud system 110 makes it possible to inquire as to data stored in a cloud to which the user his subscribed among clouds grouped as a family cloud. For this, the public personal cloud system 110 verifies and authenticates an access and the like of the subscriber through interoperation with a Certificate Authority (CA), an authentication server or an authentication authority (hereinafter, referred to as "CA") 120. Herein, the UE1 140-1, the UE2 140-2 and the UE3 140-3 may be implemented in an electronic device including a portable terminal such as, for example, a smart phone and a mobile telecommunication terminal.

The CA 120 performs a role of verifying and authenticating an access and the like of a subscriber. More particularly, the CA 120 performs a role of generating and distributing a related security key for authentication of the subscriber. The CA 120 generates a public key and a secret key.

Cloud hub A 131 and cloud hub B 132, which are local cloud storage devices installed by a user in a home, an office and the like, provide a local cloud service. The cloud hub A 131 and cloud hub B 132 can be accessed even by the public personal cloud system 110. The cloud hub A 131 and cloud hub B 132 may function as an equipment for a user equipment to access a core network, for example, an Internet network. For example, the equipment for accessing the Internet network may include an Access Point (AP), a small Base Station (BS), a femto BS and the like. In view of a user, the cloud hub A 131 and cloud hub B 132 are divided into a cloud hub to which the user has subscribed for the purpose of accessing, using and having an authority of data management and the like and a cloud hub to which the user is subscribed as a family. For convenience in explanation, the present exemplary embodiment defines the 'cloud hub to which a user is subscribed for the purpose of access and data management' as a 'main cloud hub', and the 'cloud hub to which a user is subscribed as a family' as a 'family cloud hub'. For example, if a user A installs a cloud hub A 131 and subscribes to the cloud hub A 131 as an owner through a UE1 140-1 that is his/her own user equipment, the cloud hub A 131 becomes a main cloud hub for the UE1 140-1. Also, if the user A subscribes to a cloud hub B 132, which is a main cloud hub of another user B, as a family through the UE1 140-1, the cloud hub B 132 becomes a family cloud hub for the UE1 140-1. That is, the cloud hub A 131 and cloud hub B 132 can register the UE1 140-1 and UE2 140-2 as a main subscriber or a family subscriber.

The UE1 140-1, UE2 140-2, and UE3 140-3 are user equipment, examples of which include a Consumer Electronics (CE) device such as a personal computer, a notebook computer and the like, a terminal in which the Internet may be accessed such as a mobile phone, a smart phone and the like, and devices such as a mobile TeleVision (TV) and the like. A user can store data in the public personal cloud system 110 through the respective one of UE1 140-1, UE2 140-2, and UE3 140-3, and inquire as to the data stored in the public personal cloud system 110, through the Internet network.

More particularly, according to an exemplary embodiment of the present invention, the UE 140 can access to the main cloud hub and the family cloud hub, and inquire as to data and contents stored in the main cloud hub, directly to the main cloud hub and through the family cloud hub or through an external Internet network. For example, when the cloud hub A 131 is a main cloud hub of UE1 140-1 and the cloud hub B 132 is a family cloud hub of the UE1 140-1, the UE1 140-1 can have direct access to the cloud hub A 131 and inquire as to data and contents stored in the main cloud hub, i.e., the cloud hub A 131. Also, the UE1 140-1 may gain access to the cloud hub B 132 and inquire as to the data and contents stored in the cloud hub A 131. Also, the UE1 140-1 can access the public personal cloud system 110 through an external Internet network and inquire as to the data and contents stored in the cloud hub A 131.

As described above, when one of UE1 140-1, UE2 140-2, and UE3 140-3 is provided with a cloud service, the UE 140 can share data or utility of a cloud defined as a family cloud. And, security and access management, data management and access are facilitated by allowing the public personal cloud system 110 managing the family cloud to take charge of verification for access and authentication of the respective one of UE1 140-1, UE2 140-2, and UE3 140-3. The aforementioned method is similarly applicable to other mobile communication systems or Internet service systems having a similar technological background, channel form, network architecture, or protocol, or a different protocol performing a similar operation, through modification within the spirit and scope of the invention. This would be possible by way of the knowledge of a person of ordinary skill in the field of the present disclosure.

Figure 2:
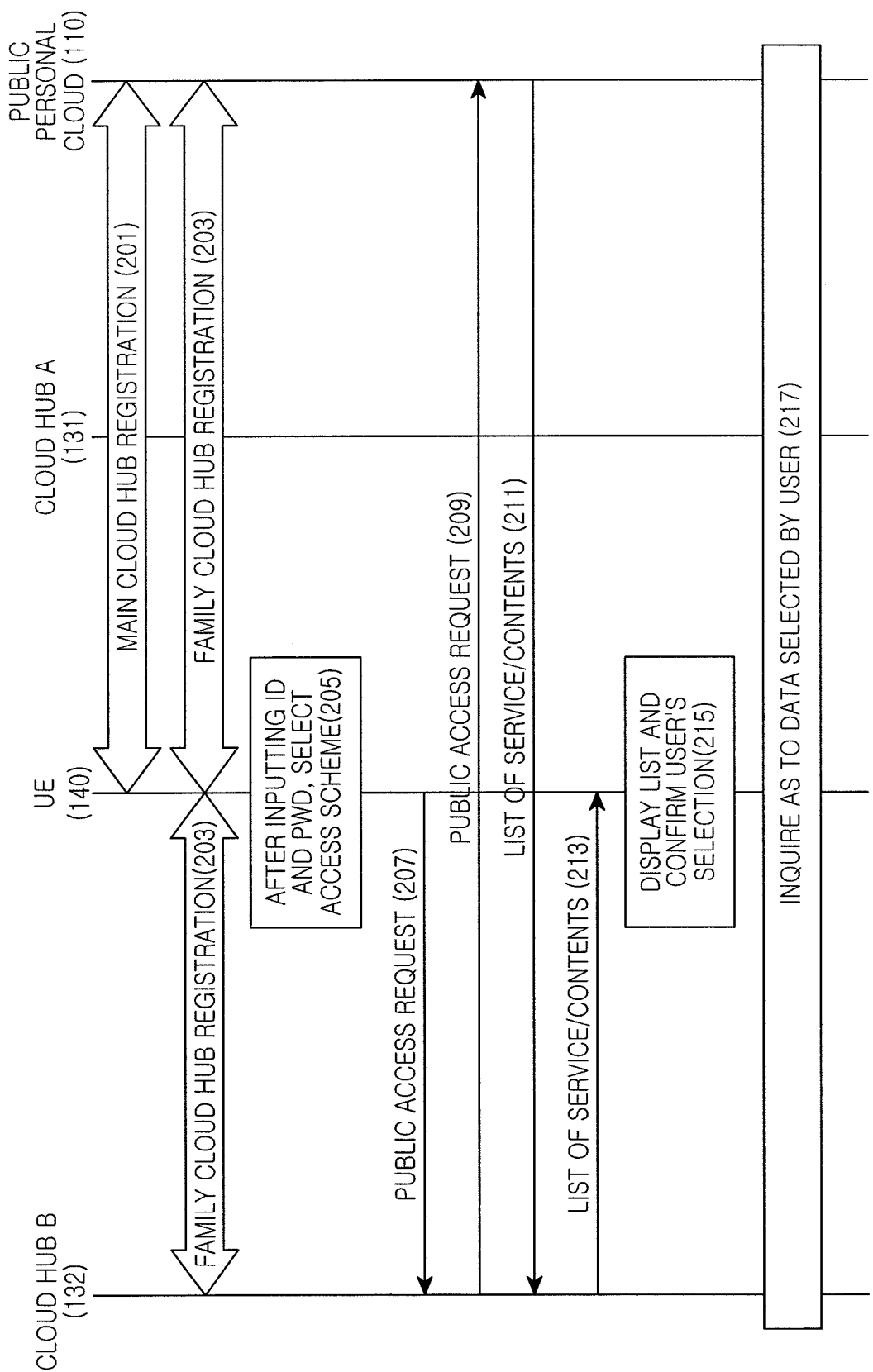
FIG. 2 is a diagram illustrating signaling for service provision in a cloud computing system according to an exemplary embodiment of the present invention.

FIG. 2 illustrates signaling for service provision in a cloud computing system according to an exemplary embodiment of the present invention.

Referring to FIG. 2, in step 201, a UE 140 performs a main cloud hub registration procedure with a cloud hub A 131 and a public personal cloud system 110. The main cloud hub registration procedure represents a process in which a user equipment is registered as a main subscriber to a corresponding cloud hub. The main cloud hub registration procedure includes a process of generating an IDentifier (ID) of a user and a PassWorD (PWD) for a cloud service, a process of generating and distributing security keys for data encryption and the like. A detailed process of the main cloud hub registration procedure is described with reference to FIG. 3 further below.

After that, in step 203, the UE 140 performs a family cloud hub registration procedure with a cloud hub B 132 and the public personal cloud system 110. The family cloud hub registration procedure represents a process in which a user equipment is registered as a family subscriber to a corresponding cloud hub. The family cloud hub registration procedure includes a process of confirming an ID of a user and a PWD for a cloud service, a process of generating and distributing security keys for data encryption, a process of updating a family list and the like. A detailed process of the family cloud hub registration procedure is described with reference to FIG. 4 further below.

Next, in step 205, the UE 140 receives an input of an ID and a PWD from the user under an environment in which the cloud hub B 132 is accessible and then, confirms a service scheme selected by the user. The service scheme corresponds to a cloud and reception of service for access by the UE 140. The service scheme includes a public access having access to the public personal cloud system 110 and receiving service, and a local access having access to a currently accessible cloud hub and receiving service. At this time, the present exemplary embodiment assumes that the UE 140 is currently in an environment in which it is accessible to the cloud hub B 132. That is, an operation of selecting the service scheme is a process of having access to the cloud hub B 132 located in a local cloud access and selecting whether to receive data service from the cloud hub B 132 located in the local cloud access or whether to receive data service from the public personal cloud system 110 that is a public personal cloud. At this time, the present exemplary embodiment assumes that the user selects the public access service scheme. In this case, the user of the UE 140 can receive the service from not only the public personal cloud system 110 but also his/her own main cloud hub, which is the cloud hub A 131, and the cloud hub B 132 currently physically accessed by himself/herself.

After that, in step 207, the UE 140 sends a public access request to the cloud hub B 132. And then, in step 209, the cloud hub B 132 forwards the public access request of the UE 140 to the public personal cloud system 110. Here, the public access request can include the ID of the user of the UE 140 and the PWD.

Next, in step 211, the public personal cloud system 110 sends a list of providable service/contents to the cloud hub B 132. Here, the providable service/contents can include service/contents providable in the public personal cloud system 110 and can further include service/contents providable in the cloud hub A 131. Or, the providable service/contents can further include service/contents providable in the cloud hub B 132 that is the family cloud. After that, in step 213, the cloud hub B 132 having received the list of service/contents from the public personal cloud system 110 sends the list of providable service/contents to the UE 140. At this time, when the list does not include a list of service/contents providable in the cloud hub B 132, the cloud hub B 132 can add the list of service/contents providable in the cloud hub B 132, to the list.

In step 215, the UE 140 displays the list of service/contents received from the cloud hub B 132 using a display so that the user can see the list of service/contents, and confirms the user's selection. For example, the list of service/contents can include ① an item representing at least one service/contents provided in a public cloud, ② an item representing at least one service/contents provided in the cloud hub A 131, and ③ an item representing at least one service/contents provided in the cloud hub B 132. The item representing the at least one service/contents of the cloud hub A 131 may be included in the service/contents list that the UE 140 can be provided with the at least one service/contents of the cloud hub A 131. The reason the UE 140 can be provided with the at least one service/contents of the cloud hub A 131 despite the fact that it is in a state in which the UE 140 gains access to the cloud hub B 132 is that the cloud hub A 131 and the cloud hub B 132 are mutual family clouds and the user has subscribed to the cloud hub A 131 as a main subscriber and to the cloud hub B 132 as a family subscriber.

Next, in step 217, the UE 140 performs a procedure of inquiring as to data for the service/contents selected by the user. A detailed procedure of the inquiring of the data is described with reference to FIGS. 5A to 7E further below.

Figure 3:
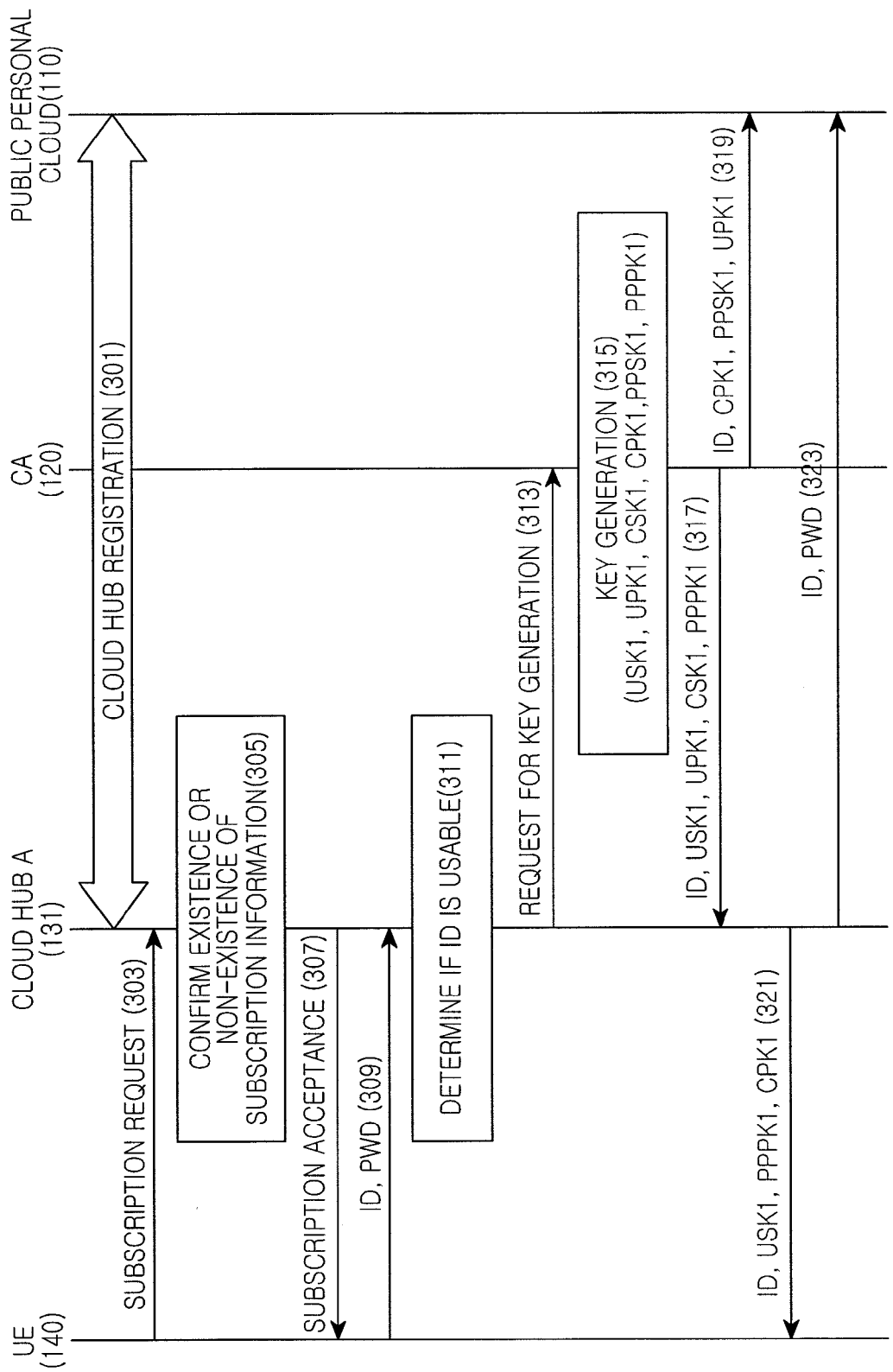
FIG. 3 is a diagram illustrating signaling for subscription to a main cloud in a cloud computing system according to an exemplary embodiment of the present invention.

FIG. 3 illustrates signaling for subscription to a main cloud in a cloud computing system according to an exemplary embodiment of the present invention.

Referring to FIG. 3, in step 301, a cloud hub A 131 performs a cloud hub registration procedure with a public personal cloud system 110. The cloud hub registration procedure can be carried out when the cloud hub A 131 is first installed. The cloud hub registration procedure is a process for informing the public personal cloud system 110 of the existence of the cloud hub A 131 and placing the cloud hub A 131 and the public personal cloud system 110 in a mutually interoperable state. A detailed process of the cloud hub registration procedure can be accomplished in various schemes. For example, the cloud hub A 131 sends identification information of the cloud hub A 131 to the public personal cloud system 110, and the public personal cloud system 110 verifies if the cloud hub A 131 is able to be registered, registers the cloud hub A 131, and notifies the cloud hub A 131 of the completion of the registration. For instance, the identification information can include an ID, a pin number and the like. The identification information can be unique information other than those listed.

After that, in step 303, the UE 140 sends a subscription request to the cloud hub A 131 according to the user's manipulation. Here, the subscription request includes identification information of a user or the UE 140. For example, the identification information can include an identification code or identifier of the UE 140 (Here, the identifier represents a unique identifier of a terminal used in communication unlike the ID mentioned after), the ID, a Media Access Control (MAC) address, an Internet Protocol (IP) address, a full name of the user, a phone number, a resident registration number and the like. The identification information can be unique information other than those listed.

Next, in step 305, the cloud hub A 131 determines if subscription information about the user exists. That is, the cloud hub A 131 stores information of previously subscribed subscribers, and determines if the identification information included in the subscription request is included in the information of the subscribers. If the subscription information of the user of the UE 140 does not exist, in other words, if the user of the UE 140 has never subscribed to the cloud hub A 131, in step 307, the cloud hub A 131 informs the UE 140 that subscription is possible by sending a subscription acceptance to the UE 140.

After that, in step 309, the UE 140 having received the subscription acceptance receives an input of an ID and a PWD for a cloud service from the user, and sends the ID and the PWD to the cloud hub A 131. According to a detailed exemplary embodiment of the present invention, the ID can be modified variously, for example, the ID can be an e-mail address. Next, in step 311, the cloud hub A 131 determines if the ID received from the UE 140 is usable. That is, the cloud hub A 131 determines if the same ID as the ID received from the UE 140 has already been registered. Here, the present exemplary embodiment assumes that the ID received from the UE 140 is usable. According to this, in step 313, the cloud hub A 131 sends the CA 120 a request for generation of a security key to be used at the time service is provided to the user of the UE 140. Here, the request for generation of the security key can include the ID of the user of the UE 140.

In step 315, the CA 120 having received the request for generation of the security key generates a User Secret Key 1 (USK1) that is a user secret key and a User Public Key 1 (UPK1) that is a user public key so that mutual authentication between the user and the cloud hub A 131 is possible, generates a CSK1 that is a secret key of the cloud hub A 131 and a CPK1 that is a public key of the cloud hub A 131 so that mutual authentication between the cloud hub A 131 and the public personal cloud system 110 is possible, and generates a Public Personal Secret Key 1 (PPSK1) that is a secret key of the public personal cloud system 110 and a Public Personal Public Key 1 (PPPK1) that is a public key of the public personal cloud system 110 so that mutual authentication between the public personal cloud system 110 and the user is possible.

Next, in step 317, the CA 120 can send the cloud hub A 131 at least one of the USK1, the UPK1, the CSK1, and the PPPK1 together with the ID of the user. According to this, the cloud hub A 131 can store at least one of the USK1, the UPK1, and the CSK1. Additionally, the cloud hub A 131 can store the PPPK1. And, in step 319, the CA 120 sends at least one of the ID, the CPK1, and the PPSK1 to the public personal cloud system 110. Additionally, the CA 120 can further send the UPK1 to the public personal cloud system 110.

In step 321, the cloud hub A 131 can send at least one of the USK1 and the PPPK1 together with the ID of the user to the UE 140. Additionally, the cloud hub A 131 can further send the CPK1 to the UE 140. According to this, the UE 140 can store the USK1 and the PPPK1 for subsequent communication. If the CPK1 is received from the cloud hub A 131, the UE 140 can store the CPK1.

Next, after completing security key distribution, in step 323, the cloud hub A 131 sends the ID and the PWD provided from the UE 140, to the public personal cloud system 110. According to this, the public personal cloud system 110 stores the ID of the user, the PWD, and information of the CPK1, the PPSK1 and the like received in step 319. If the UPK1 is received from the CA 120, the public personal cloud system 110 can store the UPK1.

Through steps 317 to 323, the UE 140 holds at least one of security keys such as the USK1, the PPPK1, the CPK1 and the like, and the cloud hub A 131 holds at least one of the ID of the user, the PWD, the UPK1, the CSK1, and the PPPK1, and the public personal cloud system 110 holds at least one of the ID of the user, the PWD, the CPK1, the PPSK1, and the UPK1.

In the exemplary embodiment described with reference to FIG. 3, step 321 does not necessarily have to be carried out before step 323. Step 323 can be carried out before step 321 or at the same time as another step according to another exemplary embodiment of the present invention.

Figure 4:
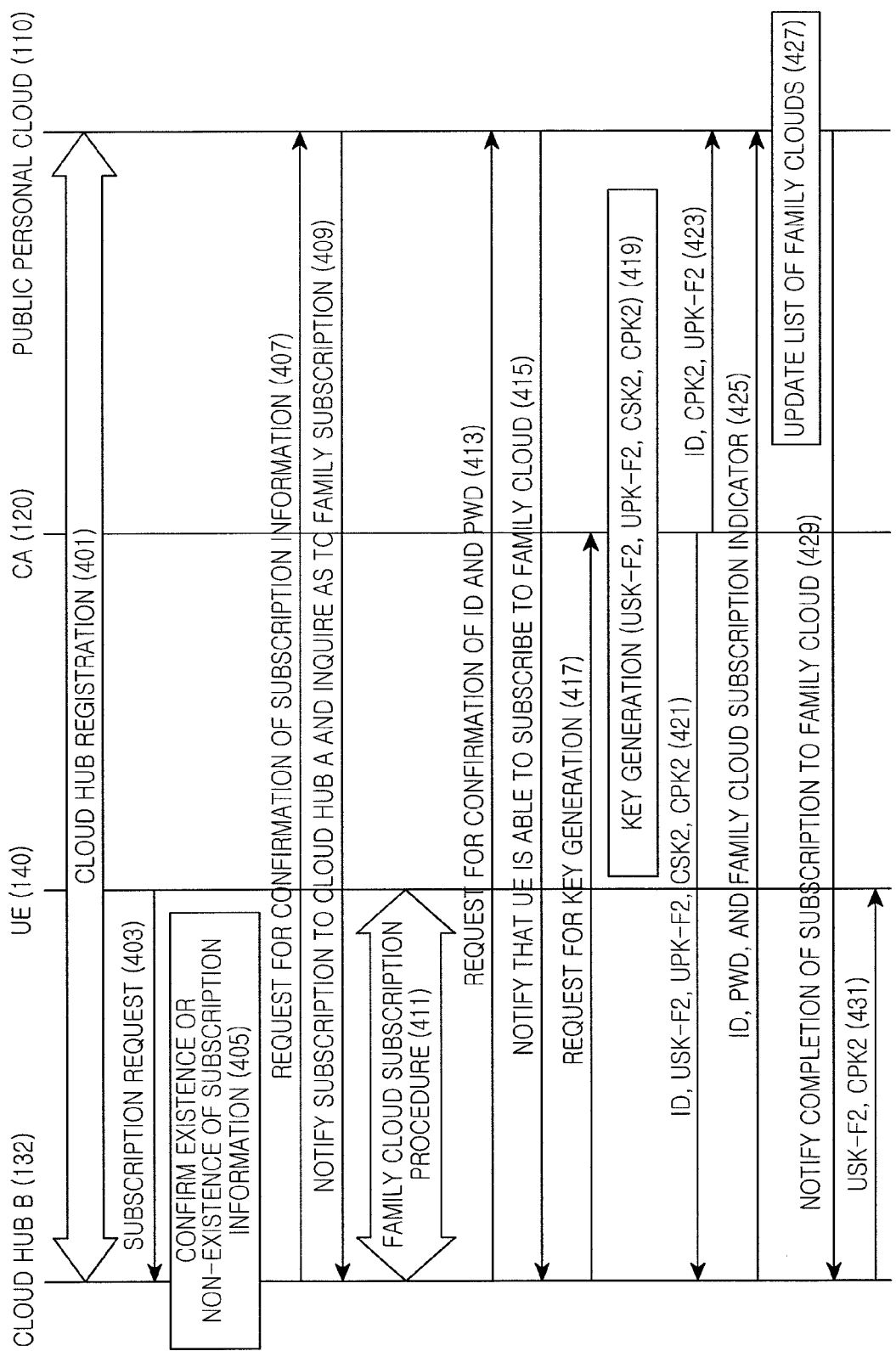
FIG. 4 is a diagram illustrating signaling for subscription to a family cloud according to an exemplary embodiment of the present invention.

FIG. 4 illustrates signaling for subscription to a family cloud according to an exemplary embodiment of the present invention.

Referring to FIG. 4, in step 401, a cloud hub B 132 performs a cloud hub registration procedure with a public personal cloud system 110. The cloud hub registration procedure can be carried out when the cloud hub B 132 is first installed. The cloud hub registration procedure is a process of informing the public personal cloud system 110 of the existence of the cloud hub B 132 and placing the cloud hub B 132 and the public personal cloud system 110 in a mutually interoperable state. A detailed process of the cloud hub registration procedure can be accomplished in various schemes. For example, the cloud hub B 132 sends identification information of the cloud hub B 132 to the public personal cloud system 110, and the public personal cloud system 110 determines if the cloud hub B 132 is able to be registered, registers the cloud hub B 132, and notifies the cloud hub B 132 of the completion of the registration. For instance, the identification information can include an ID, a pin number and the like. The identification information can be unique information other than those listed.

After that, in step 403, the UE 140 sends a subscription request to the cloud hub B 132 according to the user's manipulation. Here, the subscription request includes identification information of a user or the UE 140. For example, the identification information can include an identification code of the UE 140, an ID, a MAC address, an IP address, a full name of the user, a phone number, a resident registration number and the like. The identification information can be unique information other than those listed.

Next, in step 405, the cloud hub B 132 determines if subscription information about the user exists. That is, the cloud hub B 132 stores information of previously subscribed subscribers, and determines if the identification information included in the subscription request is included in the information of the subscribers. If the subscription information of the user of the UE 140 does not exist, in other words, if the user of the UE 140 has never subscribed to the cloud hub B 132, in step 407, the cloud hub B 132 sends a request for confirmation of the existence or non-existence of subscription information about the user of the UE 140, to the public personal cloud system 110. According to this, the public personal cloud system 110 determines if the subscription information about the user of the UE 140 exists. If the subscription information exists, the public personal cloud system 110 determines to which cloud hub the user has subscribed. Through this, the public personal cloud system 110 confirms that the user of the UE 140 has subscribed to a cloud hub A 131. According to this, in step 409, the public personal cloud system 110 notifies the cloud hub B 132 that the user of the UE 140 has subscribed to the cloud hub A 131, and inquires of the cloud hub B 132 whether the user of the UE 140 will subscribe to the cloud hub B 132 as a family cloud.

Accordingly, in step 411, the UE 140 performs a family cloud subscription procedure with the cloud hub B 132. The family cloud subscription procedure is a process in which the cloud hub B 132 inquires of the UE 140 as to its decision about family cloud subscription or non-subscription and, when the UE 140 desires to subscribe to the family cloud, the cloud hub B 132 determines whether the existing ID and PWD have ever been used in a main cloud. For example, the cloud hub B 132 notifies the UE 140 that the UE 140 has subscribed to the cloud hub A 131 and simultaneously, inquires of the UE 140 whether to register the cloud hub B 132 as the family cloud. The UE 140 confirms the user's selection that the user will subscribe to the cloud hub B 132 as the family cloud, and notifies the cloud hub B 132 of a result of the selection. In a case where the UE 140 selects subscription to the family cloud as described above, the cloud hub B 132 sends the UE 140 a request for the ID and the PWD that the user of the UE 140 has registered to the cloud hub A 131 and, in response to this, the UE 140 provides the ID and the PWD to the cloud hub B 132.

Next, in step 413, the cloud hub B 132 sends a request for confirmation of the ID and the PWD, to the public personal cloud system 110. According to this, the public personal cloud system 110 determines if an ID and a PWD included in stored subscription information are equal to the ID and the PWD confirmation requested by the cloud hub B 132. After that, in step 415, the public personal cloud system 110 having determined that the ID and the PWD included in the stored subscription information are equal to the ID and the PWD confirmation requested by the cloud hub B 132 notifies the cloud hub B 132 that the UE 140 is able to subscribe to the cloud hub B 132 as the family cloud.

If the UE 140 is able to subscribe to the cloud hub B as the family cloud, in step 417, the cloud hub B 132 sends a CA 120 a request for generation of a security key to be used at the time of provision of a service to the user of the UE 140. At this time, because the user of the UE 140 has already subscribed to the cloud hub A 131, the UE 140 already has security related information and subscriber information for the service with the cloud hub A 131 and the public personal cloud system 110. That is, the UE 140 stores at least one of a USK1, a PPPK1, and a CPK1, and the cloud hub A 131 stores at least one of an ID of the user, a PWD, a CSK1, a UPK1, and the PPPK1, and the public personal cloud system 110 stores at least one of the ID of the user, the PWD, the CPK1, a PPSK1, and the UPK1. Accordingly, subsequent steps can be a process of additionally generating and distributing remaining security related information besides the previously stored security keys.

In step 419, the CA 120 generates a USK-F2 that is a family cloud secret key of the user for accessing the cloud hub B 132 and a UPK-F2 that is a family cloud public key of the user so that mutual authentication between the user and the cloud hub B 132 as the family cloud is possible, and generates a CSK2 that is a secret key of the cloud hub B 132 and a CPK2 that is a public key of the cloud hub B 132 so that mutual authentication between the cloud hub B 132 and the public personal cloud system 110 is possible. After that, in step 421, the CA 120 can send at least one of the ID of the user, the USK-F2, the UPK-F2, and the CSK2 to the cloud hub B 132. Additionally, the CA 120 can further send the CPK2 to the cloud hub B 132. According to this, the cloud hub B 132 can store the UPK-F2 and the CSK2. Also, in step 423, the CA 120 can send the ID of the user and the CPK2 to the public personal cloud system 110. Additionally, the CA 120 can further send the UPK-F2 to the public personal cloud system 110.

After that, in step 425, the cloud hub B 132 sends at least one of the ID of the user of the UE 140, the PWD, and an indicator informing the family cloud subscription, to the public personal cloud system 110. According to another exemplary embodiment of the present invention, the indicator can be omitted. According to this, in step 427, the public personal cloud system 110 updates a list of user family clouds of the UE 140. That is, the public personal cloud system 110 adds the cloud hub B 132 to the list of user family clouds. Alternatively, setting a flag informing that the family cloud exists to an On state is possible. Here, according to another exemplary embodiment of the present invention, the flag can be replaced with other means capable of expressing the existence of the family cloud. Also, in step 427, the public personal cloud system 110 stores the CPK2 received in step 423. Also, when the UPK-F2 is received from the CA 120, the public personal cloud system 110 can store the UPK-F2. This process of storing the CPK2 or the UPK-F2 can be achieved after receiving the security key in step 423 or can be achieved in a method of storing during a process of storing family cloud subscription information of a corresponding user in step 427 and the like. After that, in step 429, the public personal cloud system 110 sends the cloud hub B 132 a notification that the UE 140 completes a successful subscription to the cloud hub B 132 as the family cloud. However, according to another exemplary embodiment of the present invention, step 429 can be omitted.

Next, in step 431, the cloud hub B 132 having received the notification that the UE 140 completes the successful family cloud subscription to the cloud hub B 132 sends the USK-F2 to the UE 140. Additionally, the cloud hub B 132 can further send the CPK2 to the UE 140. According to this, the UE 140 can store the USK-F2 for subsequent communication. In a case where the UE 140 receives the CPK2 from the cloud hub B 132, the UE 140 can store the CPK2.

Through step 419 to step 431, the UE 140 can hold at least one of the USK1, the PPPK1, the USK-F2, and the CPK2 by further storing the USK-F2 and the CPK2, and the cloud hub A 131 can hold at least one of the ID of the user, the PWD, the CSK1, and the UPK1, and the cloud hub B 132 can hold at least one of the ID of the user, the PWD, the CSK2, and the UPK-F2, and the public personal cloud system 110 can hold the ID of the user, the PWD, the CPK1, the PPSK1, the CPK2, a list of family clouds of the user, and a flag representing that the user has subscribed to the family cloud subscription.

Figure 5A:
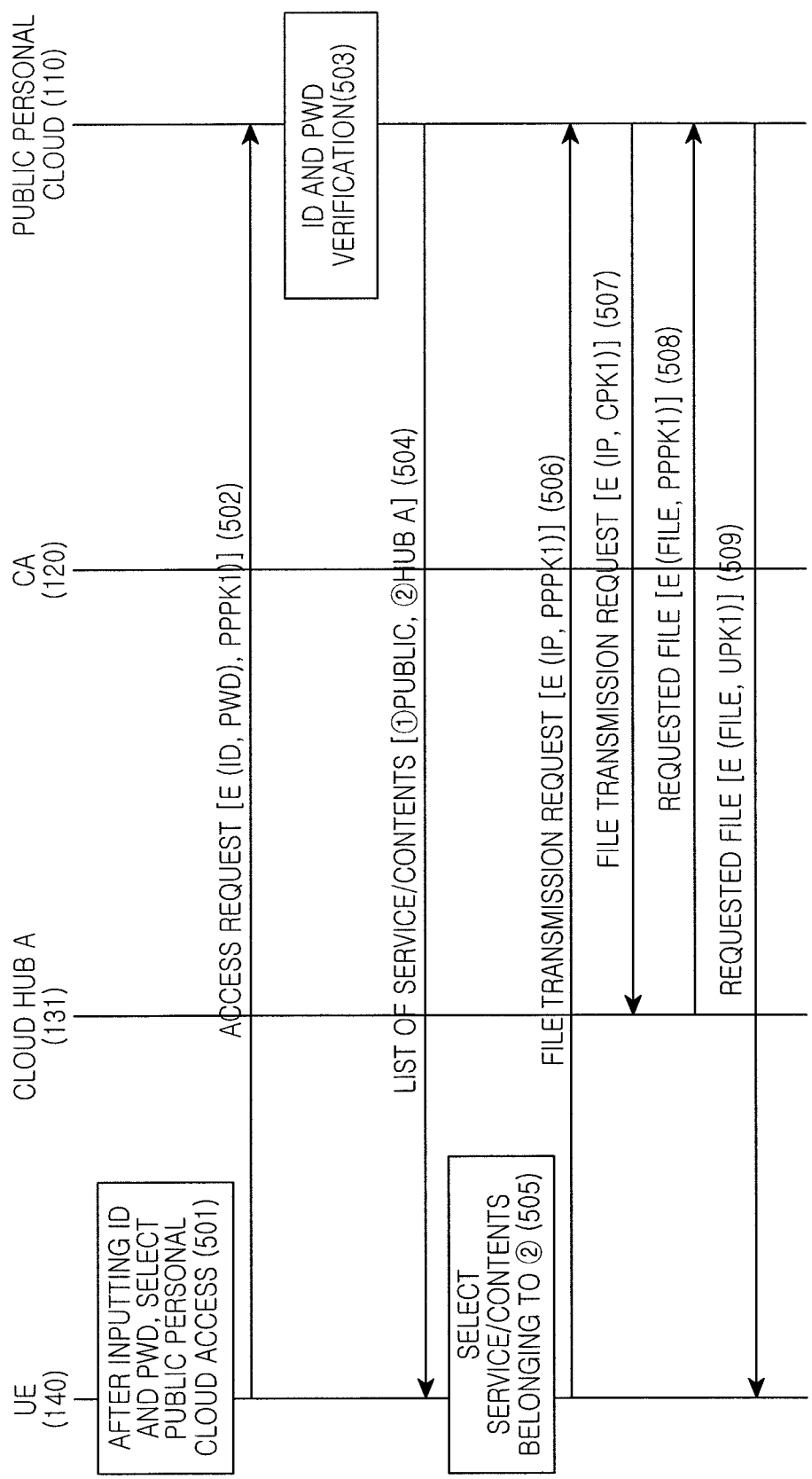
FIGS. 5A and 5B are diagrams illustrating signaling for data inquiry through a public personal cloud access according to an exemplary embodiment of the present invention.

FIG. 5A illustrates an exemplary embodiment in which, after a public personal cloud system is accessed, a UE is provided with data stored in a cloud hub through the public personal cloud system.

Referring to FIG. 5A, in step 501, the UE 140 receives an input of an ID and a PWD from a user and then, confirms an access scheme selected by the user. At this time, the present exemplary embodiment assumes that the user selects that he/she has access through the public personal cloud system 110. At this time, if the only available access scheme in one in which an access through a public cloud is possible, in other words, if the UE 140 is an environment in which it is not capable of accessing a cloud hub, a process of confirming the user's selection may be omitted, and the UE 140 may determine a public cloud access.

After that, in step 502, the UE 140 sends an access request to the public personal cloud system 110. The access request includes at least one of the ID and the PWD that are input in step 501. At this time, the ID and the PWD can be encrypted, and the encryption can be carried out using a PPPK1 that is a public key of the public personal cloud system 110. In a case where the ID and the PWD are encrypted, the public personal cloud system 110 decrypts the ID and the PWD using a PPSK1. According to another exemplary embodiment of the present invention, the encryption for the ID and the PWD can be omitted.

Next, in step 503, the public personal cloud system 110 having acquired the ID and the PWD through the access request verifies the ID and the PWD included in the access request. In other words, the public personal cloud system 110 determines if the ID and the PWD included in the access request are included in stored subscription information. That is, the public personal cloud system 110 determines if the user who has sent the access request is a registered user.

After that, in step 504, the public personal cloud system 110 sends a list of providable service/contents to the UE 140. Here, the providable service/contents can further include service/contents providable in the public personal cloud system 110 or service/contents providable in the cloud hub A 131. Because a user of the UE 140 is a main subscriber of the cloud hub A 131, he/she can inquire as to data stored in the cloud hub A 131 through the public personal cloud system 110. Accordingly, the list of service/contents includes ① an item representing service/contents provided in the public personal cloud system 110, and ② an item representing service/contents provided in the cloud hub A 131.

According to this, in step 505, the UE 140 having received the list of service/contents from the public personal cloud system 110 displays the list of service/contents through a display so that the user can view the list of service/contents, and receives an input of the user's selection or accepts the item selected by the user. At this time, the present exemplary embodiment in which the user selects the service/contents providable in the cloud hub A 131 is described.

If the user selects the service/contents providable in the cloud hub A 131, in step 506, the UE 140 sends a file transmission request to the public personal cloud system 110. The file transmission request can include an IP address of the UE 140 as a destination address to receive a transmission of data. At this time, the IP address can be encrypted, and the encryption can be performed using a PPPK1 that is a public key of the public personal cloud system 110. In a case where the IP address is encrypted, the public personal cloud system 110 can decrypt the IP address using a PPSK1. According to another exemplary embodiment of the present invention, the encryption for the IP address of the UE 140 can be omitted.

According to this, in step 507, the public personal cloud system 110 sends a file transmission request to the cloud hub A 131. At this time, the file transmission request message can be sent in which an IP address of the UE 140 is set to a destination address. On the other hand, the IP address included in the file transmission request can be encrypted, and the encryption can be performed using a CPK1 that is a public key of the cloud hub A 131. In a case where the IP address included in the file transmission request is encrypted, the cloud hub A 131 decrypts the IP address of the UE 140 using a CSK1. According to another exemplary embodiment of the present invention, the encryption for the IP address of the UE 140 can be omitted.

Upon receiving the file transmission request, in step 508, the cloud hub A 131 sends a requested file to the public personal cloud system 110. Here, the file can be encrypted, and the encryption can be performed using a PPPK1 that is a public key of the public personal cloud system 110. In a case where the file is encrypted, the public personal cloud system 110 decrypts the file using a PPSK1. According to another exemplary embodiment of the present invention, the encryption and decryption process for the file can be omitted. On the other hand, the file may be stored in a public personal cloud for use at the time of next public personal cloud access of the user.

After that, in step 509, the public personal cloud system 110 sends the file to the UE 140. Here, the file can be encrypted, and the encryption is performed using a UPK1 that is a public key of the UE 140. In a case where the file is encrypted, the UE 140 decrypts the file using a USK1. According to another exemplary embodiment of the present invention, the encryption for the file can be omitted.

Figure 5B:
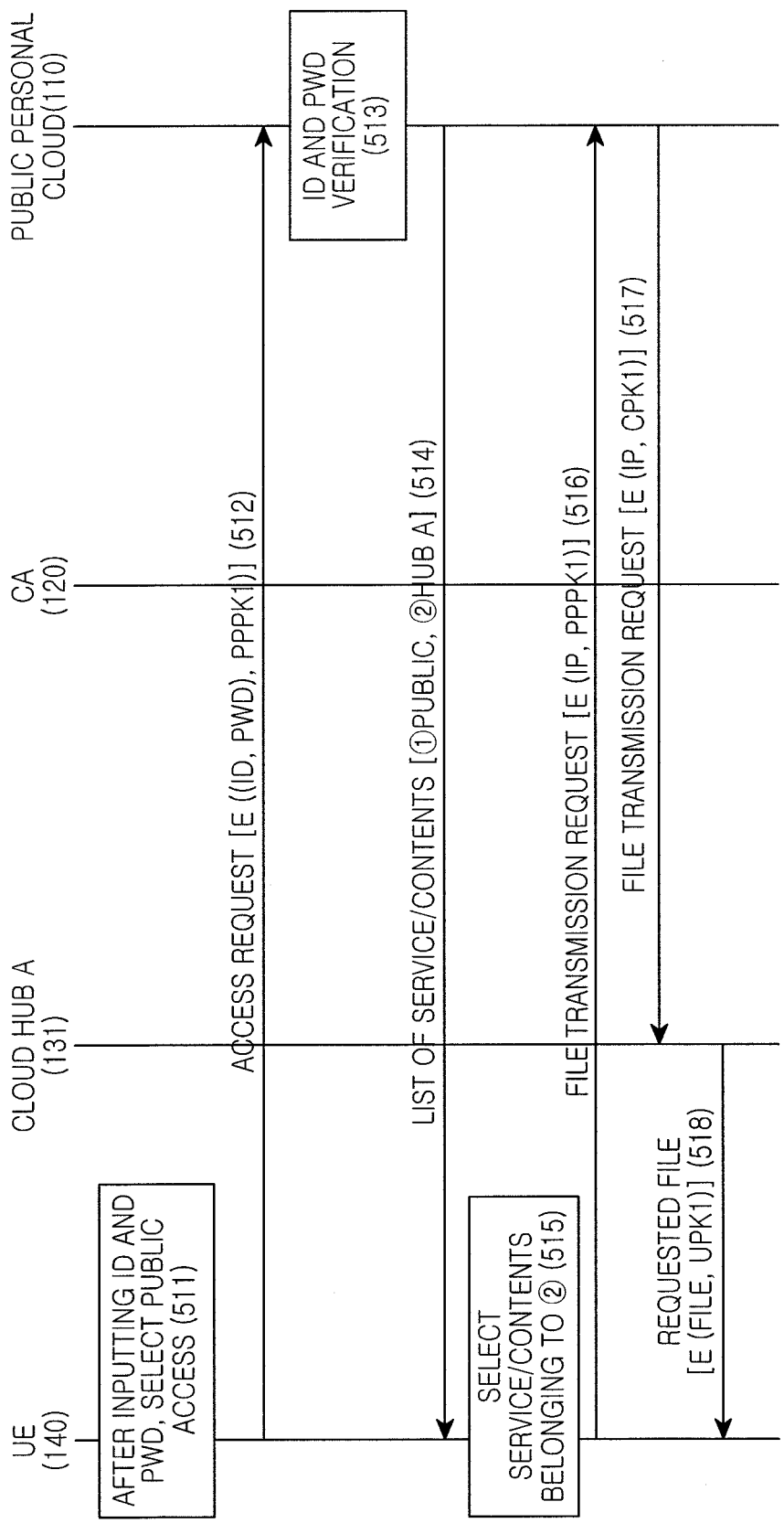

FIG. 5B illustrates an exemplary embodiment in which, after a public personal cloud is accessed, a UE is provided with data stored in a cloud hub from the cloud hub.

Referring to FIG. 5B, in step 511, the UE 140 receives an input of an ID and a PWD from a user and then, confirms an access scheme selected by the user. At this time, the present exemplary embodiment assumes that the user selects an access through a public personal cloud. At this time, if the only available access scheme is one in which only an access through the public personal cloud is possible, in other words, if the UE 140 is an environment in which it is not capable accessing a cloud hub, a process of confirming the user's selection may be omitted, and the UE 140 may determine a public personal cloud access.

After that, in step 512, the UE 140 sends an access request to the public personal cloud system 110. The access request includes the ID and the PWD that are input in step 511. At this time, the ID and the PWD can be encrypted, and the encryption can be carried out using a PPPK1 that is a public key of the public personal cloud system 110. In a case where the ID and the PWD are encrypted, the public personal cloud system 110 decrypts the ID and the PWD using a PPSK1. According to another exemplary embodiment of the present invention, the encryption for the ID and the PWD can be omitted.

Next, in step 513, the public personal cloud system 110 having acquired the ID and the PWD through the access request verifies the ID and the PWD included in the access request. In other words, the public personal cloud system 110 determines if the ID and the PWD included in the access request are included in stored user subscription information. That is, the public personal cloud system 110 determines if the user who has sent the access request is a registered user.

After that, in step 514, the public personal cloud system 110 sends a list of providable service/contents to the UE 140. Here, the providable service/contents can further include service/contents providable in the public personal cloud system 110 or service/contents providable in the cloud hub A 131. Because a user of the UE 140 is a main subscriber of the cloud hub A 131, he/she can inquire as to data stored in the cloud hub A 131 through the public personal cloud system 110. Accordingly, the list of service/contents includes at least one of ① an item representing service/contents provided in the public personal cloud system 110 and ② an item representing service/contents provided in the cloud hub A 131 or, when there are no service/contents, may include nothing.

According to this, in step 515, the UE 140 having received the list of service/contents from the public personal cloud system 110 displays the list of service/contents through a display so that the user can view the list of service/contents, and receives an input of the user's selection (or accepts the item selected by the user). At this time, the present exemplary embodiment in which the user selects the service/contents providable in the cloud hub A 131 is described.

If the user selects the service/contents providable in the cloud hub A 131, in step 516, the UE 140 sends a file transmission request to the public personal cloud system 110. The file transmission request can include an IP address of the UE 140 as a destination address to receive transmission of data. At this time, the IP address can be encrypted, and the encryption can be performed using a PPPK1 that is a public key of the public personal cloud system 110. In a case where the IP address is encrypted, the public personal cloud system 110 can decrypt the IP address of the UE 140 using a PPSK1. According to another exemplary embodiment of the present invention, the encryption for the IP address of the UE 140 can be omitted.

According to this, in step 517, the public personal cloud system 110 sends a file transmission request message to the cloud hub A 131. Here, the IP address of the UE 140 included in the file transmission request message can be encrypted, and the encryption can be performed using a CPK1 that is a public key of the cloud hub A 131. In a case where the IP address included in the file transmission request is encrypted, the cloud hub A 131 can decrypt the IP address of the UE 140 using a CSK1. According to another exemplary embodiment of the present invention, the encryption for the IP address of the UE 140 can be omitted.

Upon receiving the file transmission request, in step 518, the cloud hub A 131 sends a file requested by the UE 140 to the UE 140. Here, the file can be encrypted, and the encryption can be performed using a UPK1 that is a public key of the UE 140. In a case where the file is encrypted, the UE 140 can decrypt the file using a USK1. According to another exemplary embodiment of the present invention, the encryption for the file can be omitted.

Figure 6A:
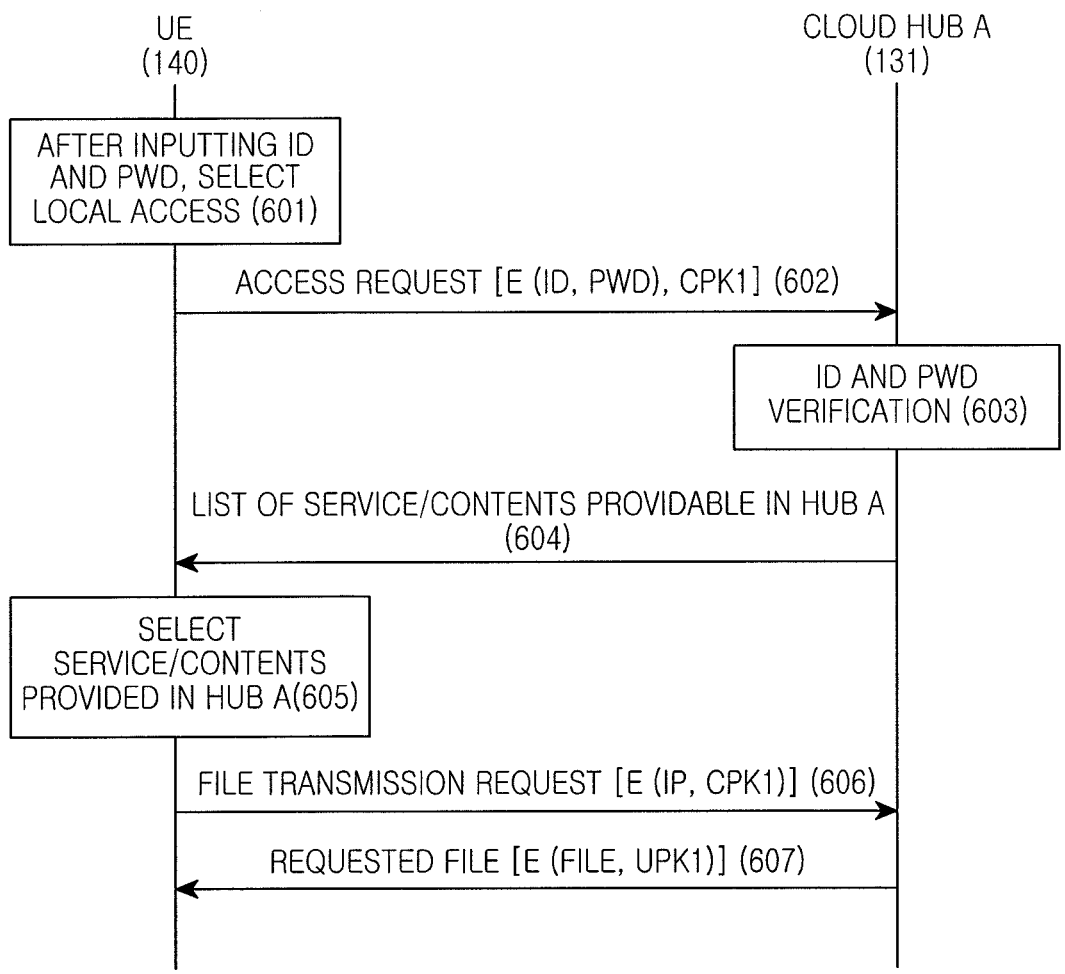
FIGS. 6A to 6D are diagrams illustrating signaling for data inquiry in an environment in which a main cloud is accessible to a local in a cloud computing system according to an exemplary embodiment of the present invention.

FIG. 6A illustrates an exemplary embodiment in which, after a local access to a cloud hub, a UE is provided with data stored in the cloud hub from the cloud hub.

Referring to FIG. 6A, in step 601, the UE 140 receives an input of an ID and a PWD from a user, and allows the user to select an access scheme. The present exemplary embodiment assumes that the UE 140 can access the cloud hub A 131 in a local environment. Accordingly, the UE 140 can access not only the cloud hub A 131 but also the public personal cloud system 110 through the cloud hub A 131. At this time, the present exemplary embodiment assumes that the user selects an access to the cloud hub A 131 as a local, through a local access.

After that, in step 602, the UE 140 sends an access request to the cloud hub A 131. The access request includes the ID and the PWD that are input in step 601. At this time, the ID and the PWD can be encrypted, and the encryption can be performed using a CPK1 that is a public key of the cloud hub A 131. In a case where the ID and the PWD are encrypted, the cloud hub A 131 decrypts the ID and the PWD using a CSK1. According to another exemplary embodiment of the present invention, the encryption for the ID and the PWD can be omitted.

Next, in step 603, the cloud hub A 131 having acquired the ID and the PWD through the access request verifies the ID and the PWD included in the access request. In other words, the cloud hub A 131 determines if the ID and the PWD included in the access request have been included in stored subscription information. That is, the cloud hub A 131 determines if the user having sent the access request is a registered user.

After that, in step 604, the cloud hub A 131 sends a list of providable service/contents to the UE 140. Here, the providable service/contents include at least one service/contents provided in the cloud hub A 131. According to this, in step 605, the UE 140 having received the list of service/contents from the cloud hub A 131 displays the list of service/contents through a display so that the user can see the list of service/contents, and receives an input of the user's selection.

According to this, in step 606, the UE 140 sends a file transmission request to the cloud hub A 131. The file transmission request may include an IP address of the UE 140 as a destination address to receive transmission of data. Here, the IP address included in the file transmission request can be encrypted, and the encryption is performed using a CPK1 that is a public key of the cloud hub A 131. In a case where the IP address included in the file transmission request is encrypted, the cloud hub A 131 decrypts the IP address using a CSK1. According to another exemplary embodiment of the present invention, the encryption for the IP address can be omitted.

Upon receiving the file transmission request, in step 607, the cloud hub A 131 sends a requested file to the UE 140. Here, the file can be encrypted, and the encryption can be performed using a UPK1 that is a public key of the UE 140. In a case where the file is encrypted, the UE 140 decrypts the file using a USK1. According to another exemplary embodiment of the present invention, the encryption for the file can be omitted.

Figure 6B:
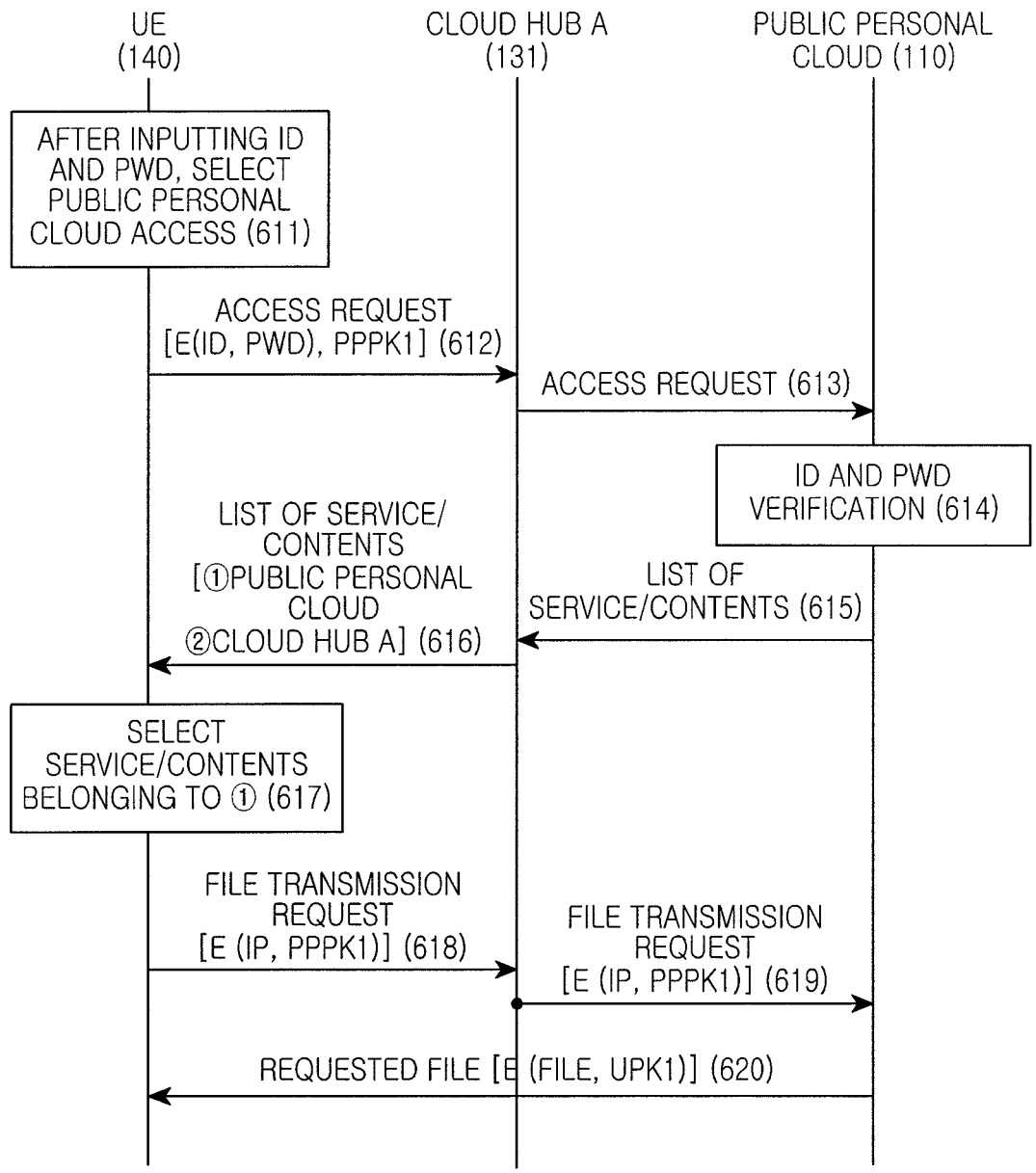

FIG. 6B illustrates an exemplary embodiment in which, after a public personal cloud system is accessed through a cloud hub, a UE is provided with data stored in the public personal cloud system from the public personal cloud system.

Referring to FIG. 6B, in step 611, the UE 140 receives an input of an ID and a PWD from a user, and receives an input of an access scheme from the user. The present exemplary embodiment assumes that the UE 140 is in an environment in which it is capable of accessing the cloud hub A 131. Accordingly, at this time, an exemplary embodiment is provided in which the user selects a public access and thus, the UE 140 can access the public personal cloud system 110 through the cloud hub A 131. After that, in step 612, the UE 140 sends an access request to the cloud hub A 131. And, in step 613, the cloud hub A 131 forwards the access request to the public personal cloud system 110. The access request can include the ID and the PWD that are input in step 611. At this time, the ID and the PWD can be encrypted, and the encryption may be performed using a PPPK1 that is a public key of the public personal cloud system 110. In a case where the ID and the PWD are encrypted, the public personal cloud system 110 decrypts the ID and the PWD using a PPSK1. According to another exemplary embodiment of the present invention, the encryption for the ID and the PWD can be omitted.

Next, in step 614, the public personal cloud system 110 having acquired the ID and the PWD through the access request verifies the ID and the PWD included in the access request. In other words, the public personal cloud system 110 determines if the ID and the PWD included in the access request are included in stored subscription information. That is, the public personal cloud system 110 determines if the user who has sent the access request is a registered user. Although not illustrated in FIG. 6B, according to another exemplary embodiment of the present invention, the cloud hub A 131 can verify the ID and the PWD. In this case, after receiving the ID and the PWD through step 612, the cloud hub A 131 verifies the ID and the PWD. For this verification, the access request including the ID and the PWD transmitted by the UE 140 in step 612 can be encrypted with a PPPK1 and a CPK1 by way of one exemplary implementation. This encryption can be achieved through various modifications, and one exemplary implementation can be E((ID, PWD), PPPK1) ∥ E((ID, PWD), CPK1) or E(((E(ID, PWD), PPPK1), ID, PWD), CPK1) and the like. The '∥' denotes a concatenation. Upon receiving the access request of step 612, the cloud hub A 131 verifies the ID and the PWD with a CSK1 and then permits a public access for a verified user only and, in step 613, the cloud hub A 131 sends the corresponding access request to the public personal cloud system 110. After that, in step 614, the public personal cloud system 110 can verify the ID and PWD by decoding the access request including the ID and the PWD with a PPSK1.

Next, in step 615, the public personal cloud system 110 sends a list of providable service/contents to the cloud hub A 131. Here, the providable service/contents can include service/contents providable in the public personal cloud system 110 and service/contents providable in the cloud hub A 131. Accordingly, the list of service/contents includes ① an item representing service/contents provided in the public personal cloud system 110 (hereinafter, 'item ②'), and ② an item representing service/contents provided in the cloud hub A 131 (hereinafter, 'item ②'). And, in step 616, the cloud hub A 131 sends the list of service/contents to the UE 140.

Upon receiving the list of service/contents from the cloud hub A 131, in step 617, the UE 140 displays the list of service/contents through a display so that the user can see the list of service/contents, and receives an input of the user's selection. At this time, the present exemplary embodiment assumes that the user selects the service/contents providable in the public personal cloud system 110, i.e., the item ①.

According to this, in step 618, the UE 140 sends a file transmission request to the cloud hub A 131. And, in step 619, the cloud hub A 131 sends the file transmission request to the public personal cloud system 110. The file transmission request can include an IP address of the UE 140 as a destination address to receive transmission of data. Here, the IP address included in the file transmission request can be encrypted, and the encryption can be performed using a PPPK1 that is a public key of the public personal cloud system 110. In a case where the IP address included in the file transmission request is encrypted, the public personal cloud system 110 decrypts the IP address of the UE 140 using a PPSK1. According to another exemplary embodiment of the present invention, the encryption for the IP address can be omitted.

Upon receiving the file transmission request, in step 620, the public personal cloud system 110 sends a requested file to the UE 140. Here, the file can be encrypted, and the encryption is performed using a UPK1 of a public key of the UE 140. In a case where the file is encrypted, the UE 140 decrypts the file using a USK1. According to another exemplary embodiment of the present invention, the encryption for the file can be omitted.

On the other hand, in the exemplary embodiment of the present invention, in step 620, the public personal cloud system 110 may directly transmit the file to the UE 140 since it is aware of the IP address of the UE 140 to which the file is to be transmitted. However, in another exemplary embodiment of the present invention not illustrated in the drawings, a technique can be realized in which the public personal cloud system 110 sends a file transmission request to the cloud hub A 131, and the cloud hub A 131 receiving the file transmission request directly transmits a requested file to the UE 140. According to this, the public personal cloud system 110 can send a file transmission request message to the cloud hub A 131. Here, an IP address of the UE 140 included in the file transmission request message can be encrypted, and the encryption can be performed using a CPK1 that is a public key of the cloud hub A 131. In a case where the IP address included in the file transmission request is encrypted, the cloud hub A 131 can decrypt the IP address of the UE 140 using a CSK1. According to another exemplary embodiment of the present invention, the encryption for the IP address can be omitted.

Upon receiving the file transmission request, in step 620, the cloud hub A 131 sends a file requested by the UE 140, to the UE 140. Here, the file can be encrypted, and the encryption can be performed using a UPK1 that is a public key of the UE 140. In a case where the file is encrypted, the UE 140 can decrypt the file using a USK1. According to another exemplary embodiment of the present invention, the encryption for the file can be omitted.

Figure 6C:
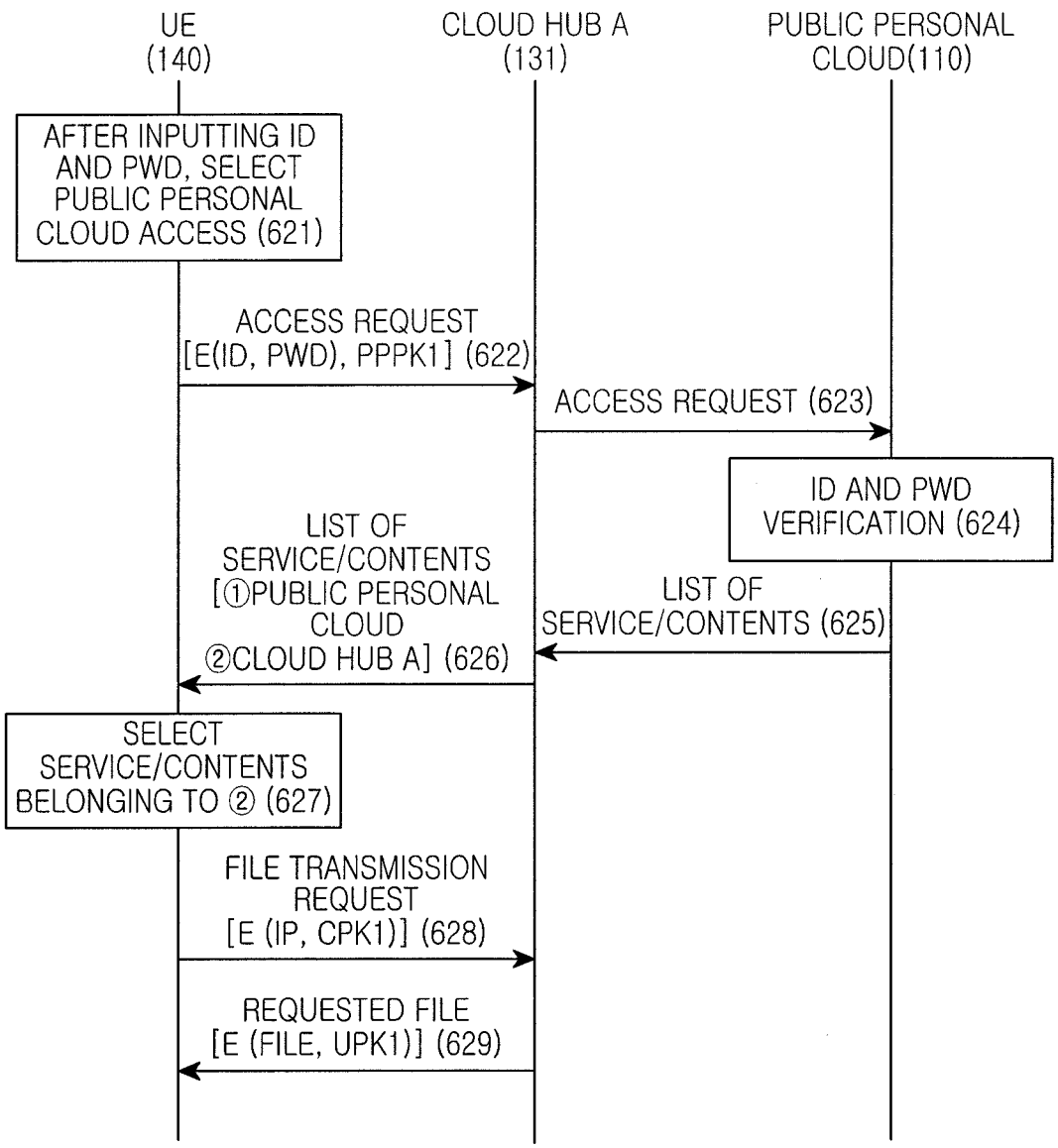

FIG. 6C illustrates an exemplary embodiment in which, after a public personal cloud system is accessed through a cloud hub, a UE is provided with data stored in the cloud hub from the cloud hub.

Referring to FIG. 6C, in step 621, the UE 140 receives an input of an ID and a PWD from a user, and receives an input of an access scheme selected by the user. The present exemplary embodiment assumes that the UE 140 selects a public personal cloud access in an environment in which it is capable of accessing the cloud hub A 131. Accordingly, the UE 140 can access the public personal cloud system 110 through the cloud hub A 131.

After that, in step 622, the UE 140 sends an access request to the cloud hub A 131. And, in step 623, the cloud hub A 131 forwards the access request to the public personal cloud system 110. The access request can include the ID and the PWD that are input in step 621. At this time, the ID and the PWD can be encrypted, and the encryption is performed using a PPPK1 that is a public key of the public personal cloud system 110. In a case where the ID and the PWD are encrypted, the public personal cloud system 110 can decrypt the ID and the PWD using a PPSK1. According to another exemplary embodiment of the present invention, the encryption for the ID and the PWD can be omitted.

Next, in step 624, the public personal cloud system 110 having acquired the ID and the PWD through the access request verifies the ID and the PWD included in the access request. In other words, the public personal cloud system 110 determines if the ID and the PWD included in the access request are included in stored subscription information. That is, the public personal cloud system 110 determines if the user who has sent the access request is a registered user. Although not illustrated in FIG. 6C, according to another exemplary embodiment of the present invention, the cloud hub A 131 can verify the ID and the PWD. In this case, after receiving the ID and the PWD through step 622, the cloud hub A 131 verifies the ID and the PWD. For this verification, the access request including the ID and the PWD transmitted by the UE 140 in step 622 can be encrypted with a PPPK1 and a CPK1 by way of one exemplary implementation. This encryption can be achieved through various modifications, and one exemplary implementation can be E((ID, PWD), PPPK1) ∥ E((ID, PWD), CPK1) or E(((E(ID, PWD), PPPK1), ID, PWD), CPK1) and the like. The '∥' denotes a concatenation. Upon receiving the access request of step 622, the cloud hub A 131 verifies the ID and the PWD with a CSK1 and then permits a public access for a verified user only and, in step 623, the cloud hub A 131 sends the corresponding access request to the public personal cloud system 110. After that, in step 624, the public personal cloud system 110 can verify the ID and PWD by decoding the access request including the ID and the PWD with a PPSK1.

Next, in step 625, the public personal cloud system 110 sends a list of providable service/contents to the cloud hub A 131. Here, the providable service/contents can include service/contents providable in the public personal cloud system 110 and service/contents providable in the cloud hub A 131. Accordingly, the list of service/contents includes ① an item representing service/contents provided in the public personal cloud system 110 (hereinafter, 'item ①'), and ② an item representing service/contents provided in the cloud hub A 131 (hereinafter, 'item ②'). And, in step 626, the cloud hub A 131 sends the list of service/contents to the UE 140.

Upon receiving the list of service/contents from the cloud hub A 131, in step 627, the UE 140 displays the list of service/contents through a display so that the user can see the list of service/contents, and receives an input of the user's selection. At this time, the present exemplary embodiment assumes that the user selects the service/contents providable in the public personal cloud system 110, i.e., the item ②.

According to this, in step 628, the UE 140 sends a file transmission request to the cloud hub A 131. The file transmission request can include an IP address of the UE 140 as a destination address to receive transmission of data. Here, the IP address included in the file transmission request can be encrypted, and the encryption can be performed using a CPK1 that is a public key of the cloud hub A 131. In a case where the IP address included in the file transmission request is encrypted, the cloud hub A 131 decrypts the IP address of the UE 140 using a CSK1. According to another exemplary embodiment of the present invention, the encryption for the IP address can be omitted.

Upon receiving the file transmission request, in step 629, the cloud hub A 131 sends a requested file to the UE 140. Here, the file can be encrypted, and the encryption is performed using a UPK1 of a public key of the UE 140. In a case where the file is encrypted, the UE 140 decrypts the file using a USK1. According to another exemplary embodiment of the present invention, the encryption for the file can be omitted.

Figure 6D:
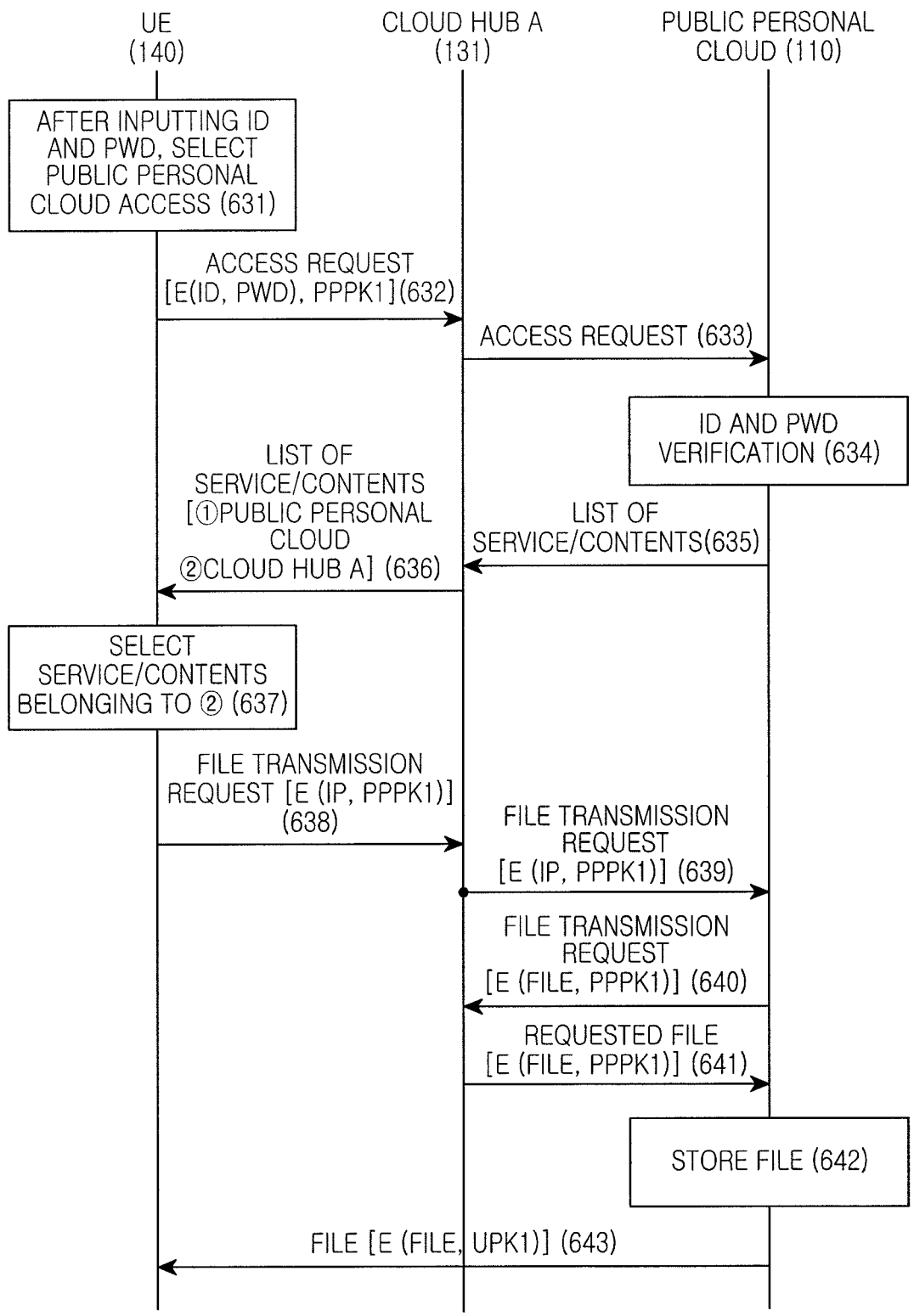

FIG. 6D illustrates an exemplary embodiment in which, after a public personal cloud system is accessed through a cloud hub, a UE is provided with data stored in the cloud hub from the public personal cloud system.

Referring to FIG. 6D, in step 631, the UE 140 receives an input of an ID and a PWD from a user, and receives a selection and input of an access scheme from the user. The present exemplary embodiment assumes that the UE 140 is in an environment in which it is capable of accessing the cloud hub A 131 and assumes that the user selects a public personal cloud access. Accordingly, the UE 140 can access the public personal cloud system 110 through the cloud hub A 131. After that, in step 632, the UE 140 sends an access request to the cloud hub A 131. And, in step 633, the cloud hub A 131 sends the access request to the public personal cloud system 110. The access request includes the ID and the PWD that are input in step 631. At this time, the ID and the PWD can be encrypted, and the encryption can be performed using a PPPK1 that is a public key of the public personal cloud system 110. In a case where the ID and the PWD are encrypted, the public personal cloud system 110 can decrypt the ID and the PWD using a PPSK1. According to another exemplary embodiment of the present invention, the encryption for the ID and the PWD can be omitted.

Next, in step 634, the public personal cloud system 110 having acquired the ID and the PWD through the access request verifies the ID and the PWD included in the access request. In other words, the public personal cloud system 110 determines if the ID and the PWD included in the access request are included in stored subscription information. That is, the public personal cloud system 110 determines if the user who has sent the access request is a registered user. Although not illustrated in FIG. 6D, according to another exemplary embodiment of the present invention, the cloud hub A 131 can verify the ID and the PWD. In this case, after receiving the ID and the PWD through step 632, the cloud hub A 131 verifies the ID and the PWD. For this verification, the access request including the ID and the PWD transmitted by the UE 140 in step 632 can be encrypted with a PPPK1 and a CPK1 by way of one exemplary implementation. This encryption can be achieved through various modifications, and one exemplary implementation can be E((ID, PWD), PPPK1) ∥ E((ID, PWD), CPK1) or E(((E(ID, PWD), PPPK1), ID, PWD), CPK1) and the like. The '∥' denotes a concatenation. Upon receiving the access request of step 632, the cloud hub A 131 verifies the ID and the PWD with a CSK1 and then permits a public access for a verified user only and, in step 633, the cloud hub A 131 sends the corresponding access request to the public personal cloud system 110. After that, in step 634, the public personal cloud system 110 can verify the ID and PWD by decoding the access request including the ID and the PWD with a PPSK1.

Next, in step 635, the public personal cloud system 110 sends a list of providable service/contents to the cloud hub A 131. Here, the providable service/contents can include service/contents providable in the public personal cloud system 110 and service/contents providable in the cloud hub A 131. Accordingly, the list of service/contents includes ① an item representing service/contents provided in the public personal cloud system 110 (hereinafter, 'item ①'), and ② an item representing service/contents provided in the cloud hub A 131 (hereinafter, 'item ②'). And, in step 636, the cloud hub A 131 sends the list of service/contents to the UE 140.

Upon receiving the list of service/contents from the cloud hub A 131, in step 637, the UE 140 displays the list of service/contents through a display so that the user can see the list of service/contents, and receives an input of the user's selection. At this time, the present exemplary embodiment assumes that the user selects the service/contents providable in the cloud hub A 131, i.e., the item ②.

According to this, in step 638, the UE 140 sends a file transmission request to the cloud hub A 131. And, in step 639, the cloud hub A 131 sends the file transmission request to the public personal cloud system 110. The file transmission request can include an IP address of the UE 140 as a destination address to receive the transmission of data. Here, the IP address included in the file transmission request can be encrypted, and the encryption can be performed using a PPPK1 that is a public key of the public personal cloud system 110. In a case where the IP address included in the file transmission request is encrypted, the public personal cloud system 110 can decrypt the IP address of the UE 140 using a PPSK1. According to another exemplary embodiment of the present invention, the encryption for the IP address can be omitted.

According to this, in step 640, the public personal cloud system 110 sends a file transmission request to the cloud hub A 131. This file transmission request can include an IP address of the UE 140. Here, the IP address of the UE 140 included in the file transmission request can be encrypted, and the encryption can be performed using a CPK1 that is a public key of the cloud hub A 131. In a case where the IP address included in the file transmission request is encrypted, the cloud hub A 131 can decrypt the IP address of the UE 140 using a CSK1. According to another exemplary embodiment of the present invention, the encryption for the IP address can be omitted.

Upon receiving the file transmission request, in step 641, the cloud hub A 131 sends a requested file to the public personal cloud system 110. Here, the file can be encrypted, and the encryption is performed using a PPPK1 of a public key of the public personal cloud system 110. In a case where the file is encrypted, the public personal cloud system 110 can decrypt the file using a PPSK1. According to another exemplary embodiment of the present invention, the encryption for the file can be omitted.

Upon receiving the file, in step 642, the public personal cloud system 110 can store the file. The file is provided in the cloud hub A 131, but the public personal cloud system 110 can store the file in preparation for when a user who has the cloud hub A 131 as a main cloud sends a subsequent request for the file to the public personal cloud system 110.

After that, in step 643, the public personal cloud system 110 sends the file to the UE 140. Here, the file can be encrypted, and the encryption is performed using a UPK1 that is a public key of the UE 140. In a case where the file is encrypted, the UE 140 can decrypt the file using USK1. According to another exemplary embodiment of the present invention, the encryption for the file can be omitted.

Figure 7A:
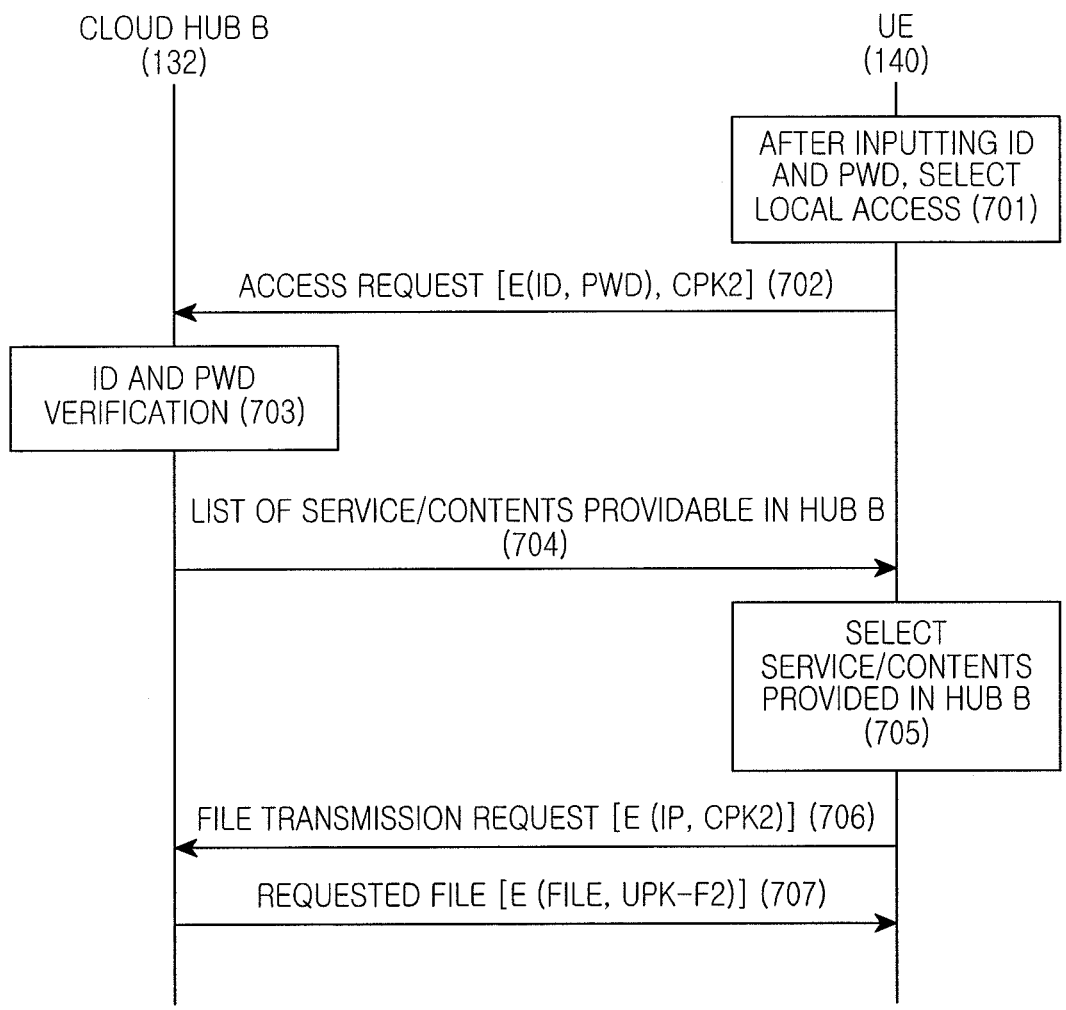

FIG. 7A illustrates an exemplary embodiment in which, after a local access to a cloud hub, a UE is provided with data stored in the cloud hub from the cloud hub.

Referring to FIG. 7A, in step 701, the UE 140 is located in an environment in which the cloud hub B 132 is accessible and receives an input of an ID and a PWD from a user and then, the UE 140 receives an input of an access scheme from the user. The present exemplary embodiment assumes that the UE 140 is in an environment in which it is capable of accessing the cloud hub B 132, and assumes that the user selects a local access. Accordingly, the UE 140 can access the cloud hub B 132 or, through the cloud hub B 132, can access the public personal cloud system 110 and the cloud hub A 131. The present exemplary embodiment provides one exemplary implementation in which the UE 140 has access to the cloud hub B 132.

After that, in step 702, the UE 140 sends an access request to the cloud hub B 132. The access request can include the ID and the PWD that are input in step 701. At this time, the ID and the PWD can be encrypted, and the encryption may be performed using a CPK2 that is a public key of the cloud hub B 132. In a case where the ID and the PWD are encrypted, the cloud hub B 132 can decrypt the ID and the PWD using a CSK2. According to another exemplary embodiment of the present invention, the encryption for the ID and the PWD can be omitted.

Next, in step 703, the cloud hub B 132 having acquired the ID and the PWD through the access request verifies the ID and the PWD included in the access request. In other words, the cloud hub B 132 determines if the ID and the PWD included in the access request have been included in stored subscription information. That is, the cloud hub B 132 determines if the user having sent the access request is a registered user. At this time, if the user is not registered to the cloud hub B 132 as a main cloud, it is determined if the user has registered to the cloud hub B 132 as a family cloud.

After that, in step 704, the cloud hub B 132 sends a list of providable service/contents to the UE 140. Here, the providable service/contents include an item representing service/contents provided in the cloud hub B 132. According to this, in step 705, the UE 140 having received the list of service/contents from the cloud hub B 132 displays the list of service/contents through a display so that the user can see the list of service/contents, and receives an input of the user's selection.

According to this, in step 706, the UE 140 sends a file transmission request to the cloud hub B 132. The file transmission request may include an IP address of the UE 140 as a destination address to receive transmission of data. Here, the IP address included in the file transmission request can be encrypted, and the encryption can be performed using a CPK2 that is a public key of the cloud hub B 132. In a case where the IP address included in the file transmission request is encrypted, the cloud hub B 132 can decrypt the IP address using a CSK2. According to another exemplary embodiment of the present invention, the encryption for the IP address can be omitted.

Upon receiving the file transmission request, in step 707, the cloud hub B 132 sends a requested file to the UE 140. Here, the file can be encrypted, and the encryption is performed using a UPK-F2 that is a public key for a family cloud of the UE 140. In a case where the file is encrypted, the UE 140 can decrypt the file using a USK-F2. According to another exemplary embodiment of the present invention, the encryption for the file can be omitted.

Figure 7B:
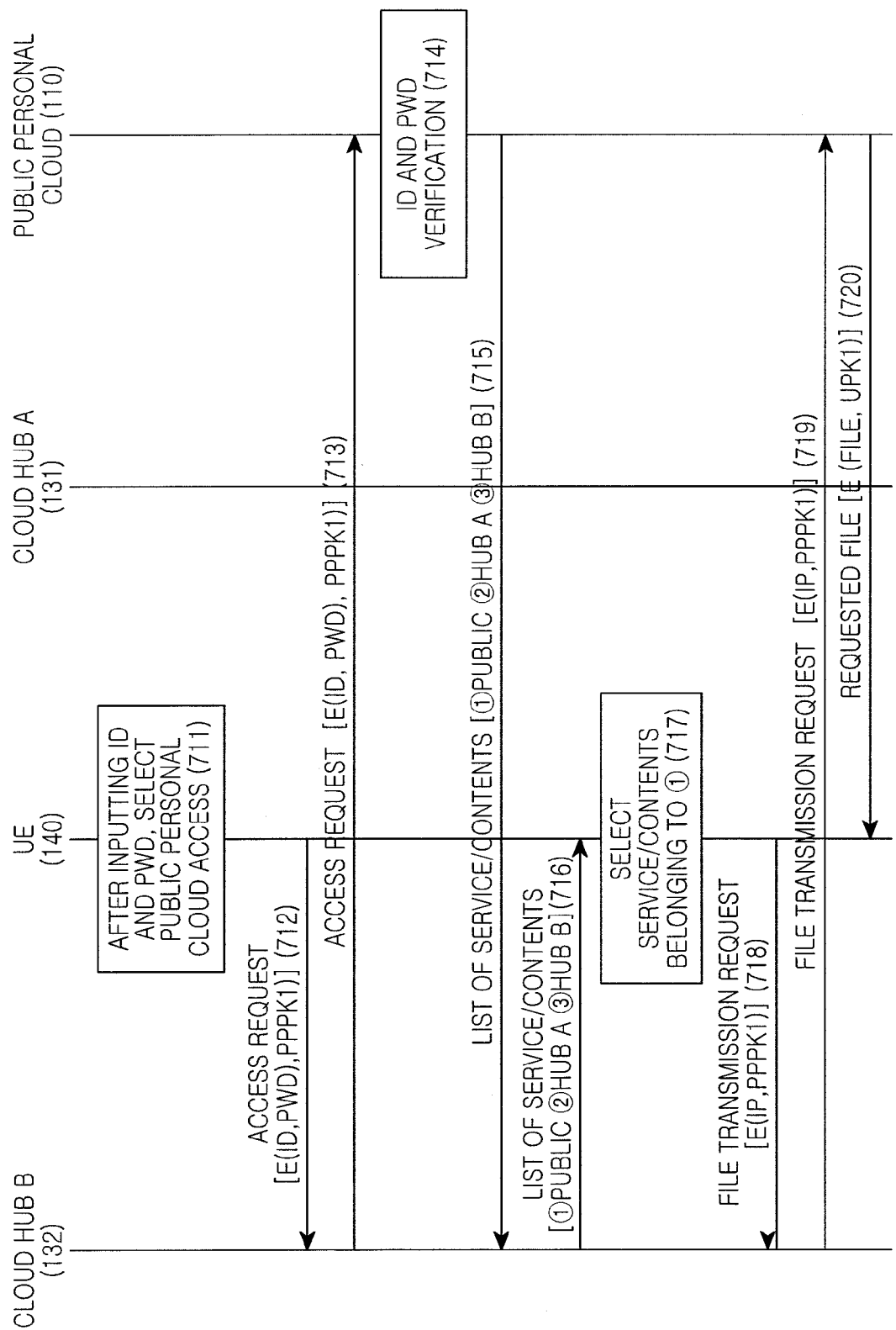

FIG. 7B illustrates an exemplary embodiment in which, after a public personal cloud system is accessed through a cloud hub in an environment in which the cloud hub is accessible, a UE is provided with data stored in the public personal cloud system from the public personal cloud system.

Referring to FIG. 7B, in step 711, in order for the UE 140 to gain access to the public personal cloud system 110 through the cloud hub B 132 in an environment in which the cloud hub B 132 is accessible, the UE 140 receives an input of an ID and a PWD from a user, and receives a selection and input of an access scheme from the user. The present exemplary embodiment assumes that the UE 140 is in an environment in which it is capable accessing the cloud hub B 132. At this time, the present exemplary embodiment assumes that the user performs a public access through the cloud hub B 132. Accordingly, the UE 140 can access the public personal cloud system 110 through the cloud hub B 132.

After that, in step 712, the UE 140 sends an access request to the cloud hub B 132. And, in step 713, the cloud hub B 132 sends the access request to the public personal cloud system 110. The access request includes the ID and the PWD that are input in step 711. At this time, the ID and the PWD can be encrypted, and the encryption can be performed using a PPPK1 that is a public key of the public personal cloud system 110. In a case where the ID and the PWD are encrypted, the public personal cloud system 110 decrypts the ID and the PWD using a PPSK1. According to another exemplary embodiment of the present invention, the encryption for the ID and the PWD can be omitted.

Next, in step 714, the public personal cloud system 110 having acquired the ID and the PWD through the access request verifies the ID and the PWD included in the access request. In other words, the public personal cloud system 110 determines if the ID and the PWD included in the access request are included in stored subscription information. That is, the public personal cloud system 110 determines if the user who has sent the access request is a registered user. Although not illustrated in FIG. 7B, according to another exemplary embodiment of the present invention, the cloud hub B 132 can verify the ID and the PWD. In this case, after receiving the ID and the PWD through step 712, the cloud hub B 132 verifies the ID and the PWD. For this verification, the access request including the ID and the PWD transmitted by the UE 140 in step 712 can be encrypted with a PPPK1 and a CPK2 by way of one exemplary implementation. This encryption can be achieved through various modifications, and one exemplary implementation can be E((ID, PWD), PPPK1) ∥ E((ID, PWD), CPK2) or E(((E(ID, PWD), PPPK1), ID, PWD), CPK2) and the like. The '∥' denotes a concatenation. Upon receiving the access request of step 712, the cloud hub A 131 verifies the ID and the PWD with a CSK2 and then permits a public access for a verified user only and, in step 713, the cloud hub A 131 sends the corresponding access request to the public personal cloud system 110. After that, in step 714, the public personal cloud system 110 can verify the ID and PWD by decoding the access request including the ID and the PWD with a PPSK1.

Next, in step 715, the public personal cloud system 110 sends a list of providable service/contents to the cloud hub B 132. Here, the providable service/contents can include service/contents providable in the public personal cloud system 110, service/contents providable in the cloud hub A 131, and service/contents providable in the cloud hub B 132. Accordingly, the list of service/contents can include ① an item representing service/contents provided in the public personal cloud system 110 (hereinafter, 'item ①'), ② an item representing service/contents provided in the cloud hub A 131 (hereinafter, 'item ②'), and ③ an item representing service/contents provided in the cloud hub B 132 (hereinafter, 'item ③').

And, in step 716, the cloud hub B 132 sends the list of service/contents to the UE 140. At this time, if the list of service/contents includes only ① the item representing service/contents provided in the public personal cloud system 110 (hereinafter, 'item ①') and ② the item representing service/contents provided in the cloud hub A 131 (hereinafter, 'item ②'), the cloud hub B 132 may add ③ the item representing service/contents provided in the cloud hub B 132 (hereinafter, 'item ③'). According to this, the list of service/contents provided to the UE 140 can include the item ①, the item ②, and the item ③.

Upon receiving the list of service/contents from the cloud hub B 132, in step 717, the UE 140 displays the list of service/contents through a display so that the user can see the list of service/contents, and receives an input of the user's selection. At this time, the present exemplary embodiment assumes that the user selects the service/contents providable in the public personal cloud system 110, i.e., the item ①.

According to this, in step 718, the UE 140 sends a file transmission request to the cloud hub B 132. And, in step 719, the cloud hub B 132 sends the file transmission request to the public personal cloud system 110. The file transmission request can include an IP address of the UE 140 as a destination address to receive transmission of data. Here, the IP address included in the file transmission request can be encrypted, and the encryption can be performed using a PPPK1 that is a public key of the public personal cloud system 110. In a case where the IP address included in the file transmission request is encrypted, the public personal cloud system 110 can decrypt the IP address of the UE 140 using a PPSK1. According to another exemplary embodiment of the present invention, the encryption for the IP address can be omitted.

Upon receiving the file transmission request, in step 720, the public personal cloud system 110 sends a file requested by the UE 140, to the UE 140. Here, the file can be encrypted, and the encryption can be performed using a UPK1 of a public key of the UE 140. In a case where the file is encrypted, the UE 140 can decrypt the file using a USK1. According to another exemplary embodiment of the present invention, the encryption for the file can be omitted.

Figure 7C:
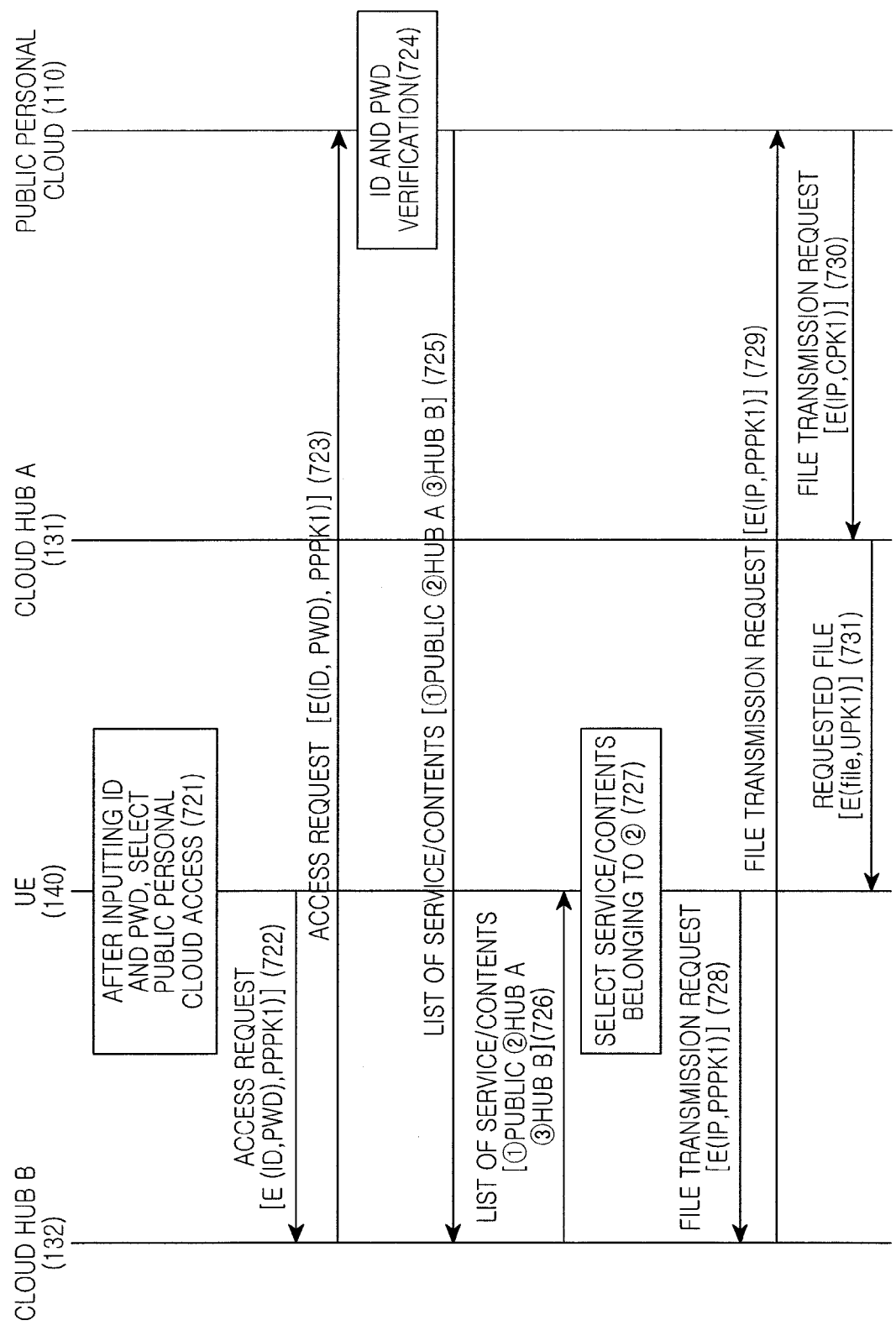

FIG. 7C illustrates an exemplary embodiment in which, after a public personal cloud system is accessed through a cloud hub in an environment in which the cloud hub is accessible, a UE sends a request for data transmission to the public personal cloud system and is provided with data stored in another cloud hub from the other cloud hub.

Referring to FIG. 7C, in step 721, the UE 140 has access to the public personal cloud system 110 through the cloud hub B 132 in the environment in which the cloud hub B 132 is accessible. That is, the UE 140 receives an input of an ID and a PWD from a user in the environment in which the cloud hub B 132 is accessible, and receives a selection and input of an access scheme from the user. The present exemplary embodiment assumes that the UE 140 is in an environment in which it is capable of accessing the cloud hub B 132, and assumes that the user selects a public access. Accordingly, the UE 140 can access the public personal cloud system 110 through the cloud hub B 132. After that, in step 722, the UE 140 sends an access request to the cloud hub B 132. And, in step 723, the cloud hub B 132 sends the access request to the public personal cloud system 110. The access request includes the ID and the PWD that are input in step 721. At this time, the ID and the PWD can be encrypted, and the encryption can be performed using a PPPK1 that is a public key of the public personal cloud system 110. In a case where the ID and the PWD are encrypted, the public personal cloud system 110 decrypts the ID and the PWD using a PPSK1. According to another exemplary embodiment of the present invention, the encryption for the ID and the PWD can be omitted.

Next, in step 724, the public personal cloud system 110 having acquired the ID and the PWD through the access request verifies the ID and the PWD included in the access request. In other words, the public personal cloud system 110 determines if the ID and the PWD included in the access request are included in stored subscription information. That is, the public personal cloud system 110 determines if the user who has sent the access request is a registered user. Although not illustrated in FIG. 7C, according to another exemplary embodiment of the present invention, the cloud hub B 132 can verify the ID and the PWD. In this case, after receiving the ID and the PWD through step 722, the cloud hub B 132 verifies the ID and the PWD. For this verification, the access request including the ID and the PWD transmitted by the UE 140 in step 722 can be encrypted with a PPPK1 and a CPK2 by way of one exemplary implementation. This encryption can be achieved through various modifications, and one exemplary implementation can be E((ID, PWD), PPPK1) ∥ E((ID, PWD), CPK2) or E(((E(ID, PWD), PPPK1), ID, PWD), CPK2) and the like. The '∥' denotes a concatenation. Upon receiving the access request of step 722, the cloud hub A 131 verifies the ID and the PWD with a CSK2 and then permits a public access for a verified user only and, in step 723, the cloud hub A 131 sends the corresponding access request to the public personal cloud system 110. After that, in step 724, the public personal cloud system 110 can verify the ID and PWD by decoding the access request including the ID and the PWD with a PPSK1.

Next, in step 725, the public personal cloud system 110 sends a list of providable service/contents to the cloud hub B 132. Here, the providable service/contents can include service/contents providable in the public personal cloud system 110, service/contents providable in the cloud hub A 131, and service/contents providable in the cloud hub B 132. Accordingly, the list of service/contents includes ① an item representing service/contents provided in the public personal cloud system 110 (hereinafter, 'item ①'), ② an item representing service/contents provided in the cloud hub A 131 (hereinafter, 'item ②'), and ③ an item representing service/contents provided in the cloud hub B 132 (hereinafter, 'item ③').

And, in step 726, the cloud hub B 132 sends the list of service/contents to the UE 140. At this time, if the list of service/contents is displayed only with ① the item representing service/contents provided in the public personal cloud system 110 (hereinafter, 'item ①') and ② the item representing service/contents provided in the cloud hub A 131 (hereinafter, 'item ②'), the cloud hub B 132 may add ③ the item representing at least one service/contents provided in the cloud hub B 132 (hereinafter, 'item ③'). According to this, the list of service/contents provided to the UE 140 can include the item ①, the item ②, the item ③ and the like.

Upon receiving the list of service/contents from the cloud hub B 132, in step 727, the UE 140 displays the list of service/contents through a display so that the user can see the list of service/contents, and receives an input of the user's selection. At this time, the present exemplary embodiment assumes that the user selects the service/contents providable in the cloud hub A 131, i.e., the item ②.

According to this, in step 728, the UE 140 sends a file transmission request to the cloud hub B 132. And, in step 729, the cloud hub B 132 sends the file transmission request to the public personal cloud system 110. The file transmission request can include an IP address of the UE 140 as a destination address to receive transmission of data. Here, the IP address included in the file transmission request can be encrypted, and the encryption can be performed using a PPPK1 that is a public key of the public personal cloud system 110. In a case where the IP address included in the file transmission request is encrypted, the public personal cloud system 110 can decrypt the IP address of the UE 140 using a PPSK1. According to another exemplary embodiment of the present invention, the encryption for the IP address can be omitted.

Accordingly, in step 730, the public personal cloud system 110 sends the file transmission request to the cloud hub A 131. Here, the IP address included in the file transmission request can be encrypted, and the encryption can be performed using a CPK1 that is a public key of the cloud hub A 131. In a case where the IP address included in the file transmission request is encrypted, the cloud hub A 131 can decrypt the IP address of the UE 140 using a CSK1. According to another exemplary embodiment of the present invention, the encryption for the IP address can be omitted.

Upon receiving the file transmission request, in step 731, the cloud hub A 131 sends a requested file to the UE 140. Here, the file can be encrypted, and the encryption can be performed using a UPK1 of a public key of the UE 140. In a case where the file is encrypted, the UE 140 can decrypt the file using a USK1. According to another exemplary embodiment of the present invention, the encryption for the file can be omitted.

FIG. 7D illustrates an exemplary embodiment in which, after a public personal cloud system is accessed through a cloud hub in an environment in which the cloud hub is accessible, a UE sends a request for data transmission to the public personal cloud system and is provided with data stored in another cloud hub from the public personal cloud system.

Referring to FIG. 7D, in step 741, the UE 140 has access to the public personal cloud system 110 through the cloud hub B 132 in the environment in which the cloud hub B 132 is accessible. That is, the UE 140 receives an input of an ID and a PWD from a user and receives an input of an access scheme from the user. The present exemplary embodiment assumes that the UE 140 is in an environment in which it is capable of accessing the cloud hub B 132, and assumes that the user selects a public access. Accordingly, the UE 140 can access the public personal cloud system 110 through the cloud hub B 132.

After that, in step 742, the UE 140 sends an access request to the cloud hub B 132. And, in step 743, the cloud hub B 132 sends the access request to the public personal cloud system 110. The access request includes the ID and the PWD that are input in step 741. At this time, the ID and the PWD can be encrypted, and the encryption can be performed using a PPPK1 that is a public key of the public personal cloud system 110. In a case where the ID and the PWD are encrypted, the public personal cloud system 110 can decrypt the ID and the PWD using a PPSK1. According to another exemplary embodiment of the present invention, the encryption for the ID and the PWD can be omitted.

Next, in step 744, the public personal cloud system 110 having acquired the ID and the PWD through the access request verifies the ID and the PWD included in the access request. In other words, the public personal cloud system 110 determines if the ID and the PWD included in the access request are included in stored subscription information. That is, the public personal cloud system 110 determines if the user who has sent the access request is a registered user. Although not illustrated in FIG. 7D, according to another exemplary embodiment of the present invention, the cloud hub B 132 can verify the ID and the PWD. In this case, after receiving the ID and the PWD through step 742, the cloud hub B 132 verifies the ID and the PWD. For this verification, the access request including the ID and the PWD transmitted by the UE 140 in step 742 can be encrypted with a PPPK1 and a CPK2 by way of one exemplary implementation. This encryption can be achieved through various modifications, and one exemplary implementation can be E((ID, PWD), PPPK1) ∥ E((ID, PWD), CPK2) or E(((E(ID, PWD), PPPK1), ID, PWD), CPK2) and the like. The '∥' denotes a concatenation. Upon receiving the access request of step 742, the cloud hub A 131 verifies the ID and the PWD with a CSK2 and then permits a public access for a verified user only and, in step 743, the cloud hub A 131 sends the corresponding access request to the public personal cloud system 110. After that, in step 744, the public personal cloud system 110 can verify the ID and PWD by decoding the access request including the ID and the PWD with a PPSK1.

Next, in step 745, the public personal cloud system 110 sends a list of providable service/contents to the cloud hub B 132. Here, the providable service/contents can include service/contents providable in the public personal cloud system 110, service/contents providable in the cloud hub A 131, and service/contents providable in the cloud hub B 132. Accordingly, the list of service/contents includes ① an item representing service/contents provided in the public personal cloud system 110 (hereinafter, 'item ①'), ② an item representing service/contents provided in the cloud hub A 131

(hereinafter, 'item ②'), and ③ an item representing service/contents provided in the cloud hub B 132 (hereinafter, 'item ③').

And, in step 746, the cloud hub B 132 sends the list of service/contents to the UE 140. At this time, if the list of service/contents includes only ① the item representing service/contents provided in the public personal cloud system 110 (hereinafter, 'item ①') and 2 the item representing service/contents provided in the cloud hub A 131 (hereinafter, 'item ②'), the cloud hub B 132 may add ③ the item representing service/contents provided in the cloud hub B 132 (hereinafter, 'item ③'). According to this, the list of service/contents provided to the UE 140 can include the item ①, the item ②, and the item ③.

Upon receiving the list of service/contents from the cloud hub B 132, in step 747, the UE 140 displays the list of service/contents through a display so that the user can see the list of service/contents, and receives an input of the user's selection. At this time, the present exemplary embodiment assumes that the user selects the service/contents providable in the cloud hub B 132, i.e., the item ②.

According to this, in step 748, the UE 140 sends a file transmission request to the cloud hub B 132. And, in step 749, the cloud hub B 132 sends the file transmission request to the public personal cloud system 110. The file transmission request can include an IP address of the UE 140 as a destination address to receive transmission of data. Here, the IP address included in the file transmission request can be encrypted, and the encryption can be performed using a PPPK1 that is a public key of the public personal cloud system 110. In a case where the IP address included in the file transmission request is encrypted, the public personal cloud system 110 can decrypt the IP address of the UE 140 using a PPSK1. According to another exemplary embodiment of the present invention, the encryption for the IP address can be omitted.

According to this, in step 750, the public personal cloud system 110 sends a file transmission request to the cloud hub A 131. Here, the file transmission request can include the IP address, and the included IP address can be encrypted. The encryption can be performed using a CPK1 that is a public key of the cloud hub A 131. In a case where the IP address included in the file transmission request is encrypted, the cloud hub A 131 can decrypt the IP address of the UE 140 using a CSK1. According to another exemplary embodiment of the present invention, the encryption for the IP address can be omitted.

Upon receiving the file transmission request, in step 751, the cloud hub A 131 sends a requested file to the public persona cloud system 110. Here, the file can be encrypted, and the encryption is performed using a PPPK1 of a public key of the public personal cloud system 110. In a case where the file is encrypted, the public personal cloud system 110 can decrypt the file using a PPSK1. According to another exemplary embodiment of the present invention, the encryption for the file can be omitted.

Upon receiving the file, in step 752, the public personal cloud system 110 can store the file. The file is provided in the cloud hub A 131, but the public personal cloud system 110 can store the file in preparation for when a user who has the cloud hub A 131 as a main cloud sends a re-request for the file to the public personal cloud system 110 at the time of subsequent access to the public personal cloud system 110.

After that, in step 753, the public personal cloud system 110 sends the file to the UE 140. Here, the file can be encrypted, and the encryption can be performed using a UPK1 that is a public key of the UE 140 or performed using all of the UPK1 and a UPK-F2 that is a public key for a family cloud of the UE 140. In a case of using all of the UPK1 and the UPK-F2, the public personal cloud system 110 can perform a twice redundant encryption using one integrated key through concatenation of two encryption keys or other operation methods, or sequentially using each encryption key. The encryption using the two encryption keys can be modified variously. In a case where the file is encrypted, the UE 140 can decrypt the file through a USK1. Or, in a case where two keys are used for encryption, the UE 140 can decrypt the file through an inverse method of an encryption process using the USK1 and a USK-F2. That is, in a case where the two keys of the UPK1 and the UPK-F2 are used for redundant encryption, the two keys, i.e., the USK1 and the USK-F2 are redundantly used for decoding. Or, in a case where one integrated key is used through concatenation of two keys of a UPK1 and a UPK-F2 or other operation methods according to another exemplary embodiment, even decoding can be applied using the one integrated key through the concatenation of the two keys (i.e., the USK1 and the USK-F2) or the other operation methods. According to another exemplary embodiment of the present invention, the encryption for the file can be omitted.

Figure 7E:
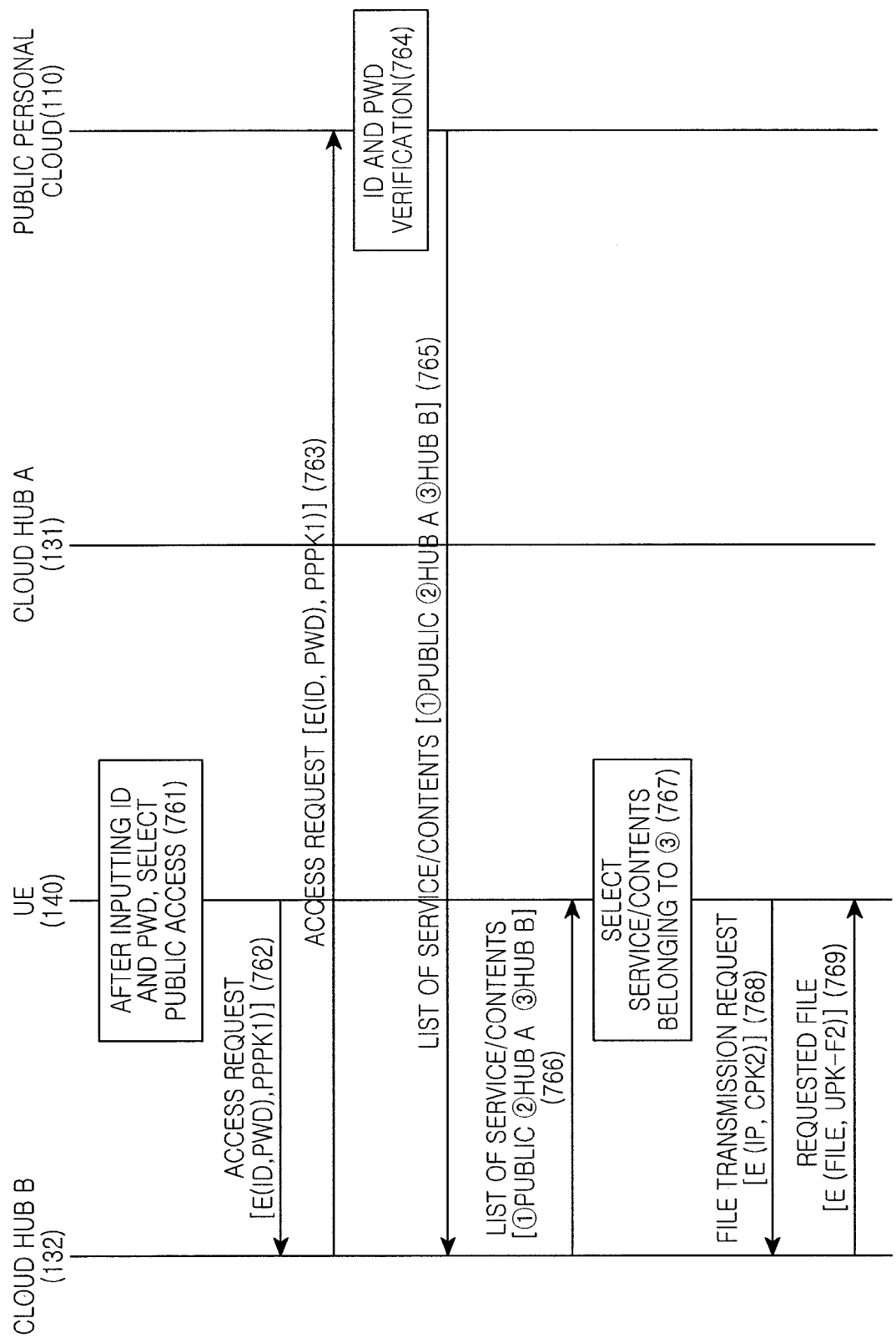

FIG. 7E illustrates an exemplary embodiment in which, a public personal cloud system through a cloud hub in an environment in which the cloud hub is accessible, a UE is provided with data stored in the cloud hub from the cloud hub.

Referring to FIG. 7E, in step 761, the UE 140 receives an input of an ID and a PWD from a user and receives an input of an access scheme from the user. The present exemplary embodiment assumes that the UE 140 is in an environment in which it is capable of accessing the cloud hub B 132, and assumes that the user selects a public access as an access scheme. Accordingly, the UE 140 can access the public personal cloud system 110 through an access to the cloud hub B 132. After that, in step 762, the UE 140 sends an access request to the cloud hub B 132. And, in step 763, the cloud hub B 132 sends the access request to the public personal cloud system 110. The access request includes the ID and the PWD that are input in step 761. At this time, the ID and the PWD can be encrypted, and the encryption can be performed using a PPPK1 that is a public key of the public personal cloud system 110. In a case where the ID and the PWD are encrypted, the public personal cloud system 110 can decrypt the ID and the PWD using a PPSK1. According to another exemplary embodiment of the present invention, the encryption for the ID and the PWD can be omitted.

Next, in step 764, the public personal cloud system 110 having acquired the ID and the PWD through the access request verifies the ID and the PWD included in the access request. In other words, the public personal cloud system 110 determines if the ID and the PWD included in the access request are included in stored subscription information. That is, the public personal cloud system 110 determines if the user who has sent the access request is a registered user. Although not illustrated in FIG. 7E, according to another exemplary embodiment of the present invention, the cloud hub B 132 can verify the ID and the PWD. In this case, after receiving the ID and the PWD through step 762, the cloud hub B 132 verifies the ID and the PWD. For this verification, the access request including the ID and the PWD transmitted by the UE 140 in step 762 can be encrypted with a PPPK1 and a CPK2 by way of one exemplary implementation. This encryption can be achieved through various modifications, and one exemplary implementation can be E((ID, PWD), PPPK1) ‖ E((ID, PWD), CPK2) or E(((E(ID, PWD), PPPK1), ID, PWD), CPK2) and the like. The '‖' denotes a concatenation. Upon receiving the access request of step 762, the cloud hub A 131 verifies the ID and the PWD with a CSK2 and then permits a public access for a verified user only and, in step 763, the cloud hub B 132 sends the corresponding access request to the public personal cloud system 110. After that, in step 764, the public personal cloud system 110 can verify the ID and PWD by decoding the access request including the ID and the PWD with a PPSK1.

Next, in step 765, the public personal cloud system 110 sends a list of providable service/contents to the cloud hub B 132. Here, the providable service/contents can include service/contents providable in the public personal cloud system 110, service/contents providable in the cloud hub A 131, and service/contents providable in the cloud hub B 132. Accordingly, the list of service/contents can include ① an item representing at least one service/contents provided in the public personal cloud system 110 (hereinafter, 'item ①'), ② an item representing at least one service/contents provided in the cloud hub A 131 (hereinafter, 'item ②'), and ③ an item representing at least one service/contents provided in the cloud hub B 132 (hereinafter, 'item ③').

And, in step 766, the cloud hub B 132 sends the list of service/contents to the UE 140. At this time, if the list of service/contents includes only ① the item representing at least one service/contents provided in the public personal cloud system 110 (hereinafter, 'item ①') and ② the item representing at least one service/contents provided in the cloud hub A 131 (hereinafter, 'item ②'), the cloud hub B 132 can add ③ the item representing at least one service/contents provided in the cloud hub B 132 (hereinafter, 'item ③'). According to this, the list of service/contents provided to the UE 140 can include the item ①, the item ②, and the item ③.

Upon receiving the list of service/contents from the cloud hub B 132, in step 767, the UE 140 displays the list of service/contents through a display so that the user can see the list of service/contents, and receives an input of the user's selection. At this time, the present exemplary embodiment assumes that the user selects the service/contents providable in the cloud hub B 132, i.e., the item ③.

According to this, in step 768, the UE 140 sends a file transmission request to the cloud hub B 132. The file transmission request can include an IP address of the UE 140 as a destination address to receive transmission of data. Here, the IP address included in the file transmission request can be encrypted, and the encryption can be performed using a CPK2 that is a public key of the cloud hub B 132. In a case where the IP address included in the file transmission request is encrypted, the cloud hub B 132 can decrypt the IP address of the UE 140 using a CSK2. According to another exemplary embodiment of the present invention, the encryption for the IP address can be omitted.

Upon receiving the file transmission request, in step 769, the cloud hub B 132 sends a file requested by the UE 140, to the UE 140. Here, the file can be encrypted, and the encryption is performed using a UPK-F2 that is a public key for a family cloud of the UE 140. In a case where the file is encrypted, the UE 140 decrypts the file using a USK-F2. According to another exemplary embodiment of the present invention, the encryption for the file can be omitted.

Figure 8:
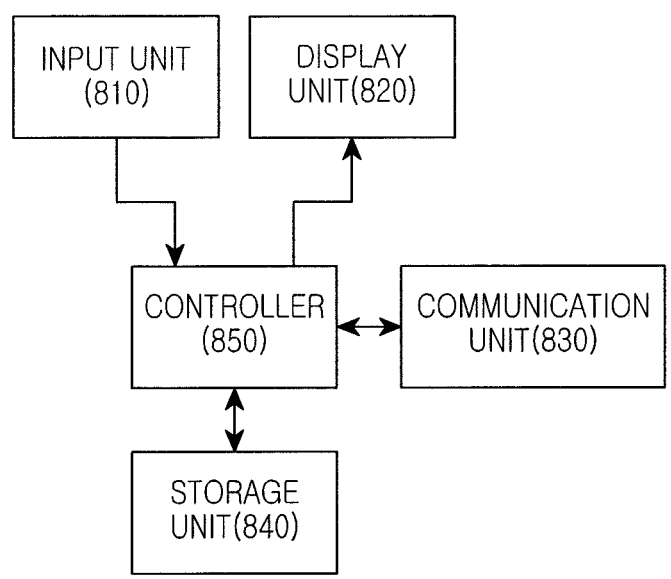
FIG. 8 is a block diagram illustrating a construction of a User Equipment (UE) in a cloud computing system according to an exemplary embodiment of the present invention.

FIG. 8 is a block diagram illustrating a construction of a UE in a cloud computing system according to an exemplary embodiment of the present invention.

Referring to FIG. 8, the UE includes an input unit 810, a display unit 820, a communication unit 830, a storage unit 840, and a controller 850.

The input unit 810 recognizes an input generated by a user, and provides information corresponding to the input, to the controller 850. That is, the input unit 810 processes the user's input through a keyboard, a keypad, a touch screen, a touch pad, a mouse, a special function button and the like. The display unit 820 displays a numeral, a character, an image and the like according to status information generated during an operation of the UE and the execution of an application program. That is, the display unit 820 displays image data provided from the controller 850 on a visual screen. For example, the display unit 820 can be composed of a Liquid Crystal Display (LCD), an Organic Light Emitting Diode (OLED) and the like.

The communication unit 830 provides an interface for transmission/reception of an external device signal. The communication unit 830 supports at least one of a wireless interface and a wired interface. When supporting the wireless interface, the communication unit 830 includes an antenna, converts transmission data into a Radio Frequency (RF) signal and transmits the RF signal to a wireless channel through the antenna, and converts an RF signal received through the antenna via the wireless channel, into reception data. At this time, the communication unit 830 performs conversion between the data and the RF signal according to a rule of a communication system. When supporting the wired interface, the communication unit 830 includes a connection terminal for wired cable connection, and converts a signal transmitted/received through the cable, into data.

The storage unit 840 stores data of a basic program for an operation of the UE, an application program, user contents and the like. More particularly, the storage unit 840 can store at least one security key for a cloud service. And, the storage unit 840 provides stored data according to a request of the controller 850.

The controller 850 controls general functions of the UE. More particularly, according to an exemplary embodiment of the present invention, the controller 850 controls functions for supporting a family cloud. In detail, the controller 850 controls a procedure in which the UE subscribes to a cloud hub as a main cloud hub or a family cloud hub. For example, the controller 850 controls the UE to subscribe to the cloud hub as illustrated in FIG. 3 and FIG. 4. Also, the controller 850 controls a procedure in which the UE inquires as to data in an environment capable of having access to the main cloud hub or the family cloud hub. For example, the controller 850 controls the UE to inquire as to data as illustrated in FIG. 5A to FIG. 7E.

Figure 9:
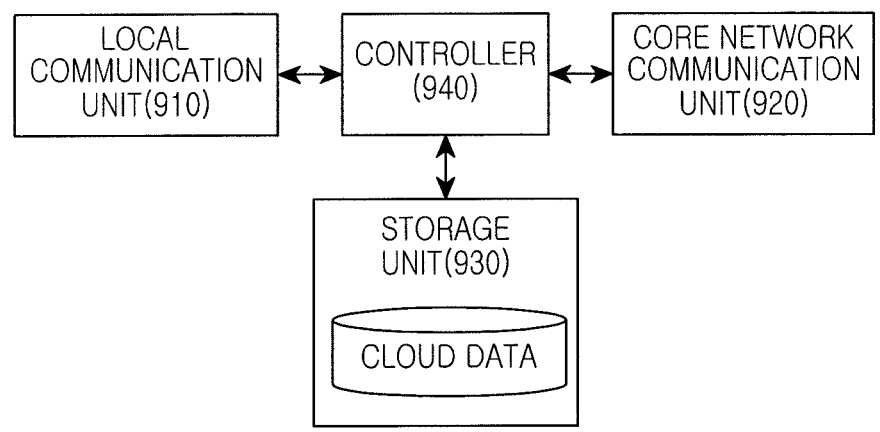
FIG. 9 is a block diagram illustrating a construction of a cloud hub in a cloud computing system according to an exemplary embodiment of the present invention.

FIG. 9 is a block diagram illustrating a construction of a cloud hub in a cloud computing system according to an exemplary embodiment of the present invention.

As illustrated in FIG. 9, the cloud hub includes a local communication unit 910, a core network communication unit 920, a storage unit 930, and a controller 940.

The local communication unit 910 provides an interface for communication with a UE. The local communication unit 910 supports at least one of a wireless interface and a wired interface. When supporting the wireless interface, the local communication unit 910 includes an antenna, and converts transmission data into an RF signal and transmits the RF signal to a wireless channel through the antenna, and converts an RF signal received through the antenna via the wireless channel, into reception data. At this time, the local communication unit 910 performs conversion between the data and the RF signal according to a standard of a communication system. When supporting the wired interface, the local communication unit 910 includes a connection terminal for wired cable connection, and converts a signal transmitted/received through the cable, into data.

The core network communication unit 920 provides an interface for the cloud hub to gain access to a core network.

That is, the core network communication unit 920 converts a bit stream transmitted to the core network into a physical signal, and converts a physical signal received from the core network into a bit stream. For example, the core network includes an Internet network.

The storage unit 930 stores data of a basic program for an operation of the cloud hub, an application program and the like. Particularly, the storage unit 930 can store at least one security key for a cloud service. Also, the storage unit 930 can store cloud data of a user who has subscribed to the cloud hub as a main cloud, cloud data of the user who has subscribed to the cloud hub as a family cloud, or the like. And, the storage unit 930 provides stored data according to a request of the controller 940.

The controller 940 controls general functions of the cloud hub. More particularly, according to an exemplary embodiment of the present invention, the controller 940 controls functions for supporting a family cloud. In detail, the controller 940 controls a procedure in which a UE subscribes to the cloud hub as a main cloud hub or as a family cloud hub. For example, the controller 940 controls the cloud hub to process the subscription of the UE as illustrated in FIG. 3 and FIG. 4. Also, the controller 940 controls a procedure in which the UE inquires as to data. For example, the controller 940 controls the cloud hub to provide data as illustrated in FIG. 5A to FIG. 7E.

As described above, there is an advantage of being able to facilitate data sharing, utility use and the like between family groups through a cloud service, and being able to establish an access of a personal cloud to overcome a data damage of a server or a weakness in security. Also, there is an advantage of, by distinguishing and operating a public cloud and a private cloud through the exemplary embodiments of the present invention, being able to overcome a weakness of data management or security, being able to safely protect data deposited to the private cloud and, by grouping and managing private clouds as a family, being able to use various contents of the private clouds grouped as the family although a cloud managed by a user is one.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An operation method of a User Equipment (UE) in a cloud computing system, the method comprising:
   transmitting a subscription request message to a first cloud hub to subscribe to the first cloud hub as a main cloud;
   receiving a subscription accept message from the first cloud hub;
   transmitting an access request message for accessing one of the first cloud hub and a public personal cloud system;
   transmitting a transmission request message for inquiring data stored in one of the first cloud hub and the public personal cloud system; and
   receiving the data,
   wherein the first cloud hub is a local physical cloud storage device installed by a user, and provides a cloud service to a UE connected by a local cloud access, and
   wherein the public personal cloud system is installed by a service provider, and provides a cloud service to a UE connected by a public cloud access.

2. The method of claim 1, further comprising:
   transmitting an IDentifier (ID) and a PassWorD (PWD) of the user for the cloud service to the first cloud hub; and
   receiving at least one security key from the first cloud hub,
   wherein the at least one security key comprises at least one of a secret key of the user, a public key of the public personal cloud system, and a public key of the first cloud hub.

3. The method of claim 1, wherein the
   access request message is transmitted to the public personal cloud system and requests a public personal cloud access,
   wherein the transmission request message is transmitted to the public personal cloud system,
   wherein the data are received from the public personal cloud system or the first cloud hub and are related to service/contents provided in the first cloud hub,
   wherein the access request message is encrypted with a public key of the public personal cloud system,
   wherein the transmission request message is encrypted with a public key of the public personal cloud system, and
   wherein the data is encrypted with a public key of the user of the UE.

4. The method of claim 1,
   wherein the access request message is transmitted to the first cloud hub and requests a local access,
   wherein the transmission request message is transmitted to the first cloud hub,
   wherein the data are received from the first cloud hub and are related to service/contents provided in the first cloud hub,
   wherein the access request message is encrypted with a public key of the first cloud hub,
   wherein the transmission request message is encrypted with a public key of the first cloud hub, and
   wherein the data is encrypted with a public key of the user of the UE.

5. The method of claim 1, wherein the access request message is transmitted to the first cloud hub and requests a public personal cloud access,
   wherein the transmission request message is transmitted to the first cloud hub, and
   wherein the data are related to service/contents selected by the user.

6. The method of claim 1, further comprising:
   transmitting another subscription request message to a second cloud hub;
      if the subscription request message is a request to register to the second cloud hub as the family cloud, transmitting, to the second cloud hub an ID and a PWD previously registered to the first cloud hub; and
      receiving at least one security key from the second cloud hub,
         wherein the at least one security key comprises at least one of a secret key for the family cloud of the user and a public key of the second cloud hub.

7. The method of claim 6, further comprising:
   transmitting another access request message for a local access, to the second cloud hub;
   receiving a list of service/contents from the second cloud hub;
   transmitting another transmission request message for inquiring data for service/contents provided in the second cloud hub, to the second cloud hub; and
   receiving the data from the second cloud hub,
   wherein the access request message is encrypted with the public key of the second cloud hub,
   wherein the transmission request message is encrypted with the public key of the second cloud hub, and
   wherein the data is encrypted with a public key for the family cloud of the user of the UE.

8. The method of claim 6, further comprising:
   transmitting another access request message for a public personal cloud access, to the second cloud hub;
   receiving a list of service/contents from the second cloud hub;
   transmitting another transmission request message for inquiring data for service/contents selected by the user, to the second cloud hub; and
   receiving the data.

9. The method of claim 1, wherein the first cloud hub comprises physical storage device for providing a cloud service.

10. The method of claim 1, wherein the first cloud hub and the public personal cloud system shares information on at least one security key that is generated during a subscription of the UE.

11. A User Equipment (UE) apparatus in a cloud computing system, the apparatus comprising:
   a communication unit configured to transmit a subscription request message to a first cloud hub to subscribe to the first cloud hub as a main cloud, to receive a subscription accept message from the first cloud hub, to transmit an access request message for accessing one of the first cloud hub and a public personal cloud system, to transmit a transmission request message for inquiring data stored in one of the first cloud hub and the public personal cloud system, and to receive the data,
   wherein the first cloud hub is a local physical cloud storage device installed by a user, and provides a cloud service to a UE connected by a local cloud access, and
   wherein the public personal cloud system is installed by a service provider, and provides a cloud service to a UE connected by a public cloud access.

12. The apparatus of claim 11, wherein the communication unit is further configured to transmit an IDentifier (ID) and a PassWorD (PWD) of the user for the cloud service to the first cloud hub, and to receive at least one security key from the first cloud hub, and
   wherein the at least one security key comprises at least one of a secret key of the user, a public key of the public personal cloud system, and a public key of the first cloud hub.

13. The apparatus of claim 11,
   wherein the access request message is transmitted to the public personal cloud system and requests a public personal cloud access,
   wherein the transmission request message is transmitted to the public personal cloud system,
   wherein the data are received from the public personal cloud system or the first cloud hub and are related to service/contents provided in the first cloud hub,
   wherein the access request message is encrypted with a public key of the public personal cloud system,
   wherein the transmission request message is encrypted with a public key of the public personal cloud system, and
   wherein the data is encrypted with a public key of the user of the UE.

14. The apparatus of claim 11,
   wherein the access request message is transmitted to the first cloud hub and requests a local access,
   wherein the transmission request message is transmitted to the first cloud hub,
   wherein the data are received from the first cloud hub and are related to service/contents provided in the first cloud hub,
   wherein the access request message is encrypted with a public key of the first cloud hub,
   wherein the transmission request message is encrypted with a public key of the first cloud hub, and
   wherein the data is encrypted with a public key of the user of the UE.

15. The apparatus of claim 11, wherein the access request message is transmitted to the first cloud hub and requests a public personal cloud access,
   wherein the transmission request message is transmitted to the first cloud hub, and
   wherein the data are related to service/contents selected by the user.

16. The apparatus of claim 11,
   wherein the communication unit is further configured to transmit another subscription request message to a second cloud hub to subscribe to the second cloud hub, if the subscription request message is a request to register the second cloud hub as the family cloud, to transmit, to the second cloud hub,. an IDentifier (ID) and a PassWorD (PWD) previously registered to the first cloud hub, and to receive at least one security key from the second cloud hub, and
   wherein the at least one security key comprises at least one of a secret key for the family cloud of the user and a public key of the second cloud hub.

17. The apparatus of claim 16, wherein the communication unit is further configured to transmit another access request message for a local access, to the second cloud hub, to receive a list of service/contents from the second cloud hub, to transmit another transmission request message for inquiring data for service/contents provided in the second cloud hub, to the second cloud hub, and to receive the data from the second cloud hub, wherein the access request message is encrypted with the public key of the second cloud hub, wherein the transmission request message is encrypted with the public key of the second cloud hub, and wherein the data is encrypted with a public key for the family cloud of the user of the UE.

18. The apparatus of claim 16, wherein the communication unit is further configured to transmit another access request message for a public personal cloud access, to the second cloud hub, to receive a list of service/contents from the second cloud hub, to transmit another transmission request message for inquiring data for service/contents selected by the user, to the second cloud hub, and to receive the data.

19. The apparatus of claim 11, wherein the first cloud hub comprises physical storage device for providing a cloud service.

20. The apparatus of claim 11, wherein the first cloud hub and the public personal cloud system shares information on at least one security key that is generated during a subscription of the UE.

* * * * *